United States Patent
Chen

(10) Patent No.: US 11,526,712 B2
(45) Date of Patent: Dec. 13, 2022

(54) TRAINING METHOD AND APPARATUS FOR IMAGE FUSION PROCESSING MODEL, DEVICE, AND STORAGE MEDIUM

(71) Applicant: Tencent Technology (Shenzhen) Company Limited, Guangdong (CN)

(72) Inventor: Fasheng Chen, Guangdong (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 219 days.

(21) Appl. No.: 17/154,335

(22) Filed: Jan. 21, 2021

(65) Prior Publication Data

US 2021/0166088 A1 Jun. 3, 2021

Related U.S. Application Data

(63) Continuation of application No. PCT/CN2020/113305, filed on Sep. 3, 2020.

(30) Foreign Application Priority Data

Sep. 29, 2019 (CN) .......................... 201910935739.4

(51) Int. Cl.
*G06K 9/62* (2022.01)
*G06T 5/00* (2006.01)
(Continued)

(52) U.S. Cl.
CPC ........... *G06K 9/6289* (2013.01); *G06K 9/629* (2013.01); *G06T 5/003* (2013.01); *G06T 5/50* (2013.01);
(Continued)

(58) Field of Classification Search
None
See application file for complete search history.

(56) References Cited

U.S. PATENT DOCUMENTS 7,133,535 B2   11/2006  Huang et al.
10,552,667 B1*  2/2020  Bogan, III ............ G06T 15/205
(Continued)

FOREIGN PATENT DOCUMENTS

CN   108171223 A   6/2018
CN   108268845 A   7/2018
(Continued)

OTHER PUBLICATIONS

Guo et al. (Feb. 2019). A Face Replacement Neural Network for Image and Video. In Proceedings of the 2019 11th International Conference on Machine Learning and Computing (pp. 163-167). (Year: 2019).*

(Continued)

*Primary Examiner* — Kee M Tung
*Assistant Examiner* — Jed-Justin Imperial
(74) *Attorney, Agent, or Firm* — Crowell & Moring LLP

(57) ABSTRACT

A training method for an image fusion processing model is provided. The method includes: obtaining an image set, and compressing the image set, updating a parameter of an encoder of a single image processing model and a parameter of a decoder of the single image processing model according to a single to-be-replaced face in the original image set, and updating parameters of an encoder and a decoder that are of the image fusion processing model according to different to-be-replaced faces and different target faces that are in the original image set while the parameters of the encoder and the decoder that are of the single image processing model remain unchanged. An image processing method and apparatus for an image fusion processing model, an electronic device, and a storage medium are further provided.

20 Claims, 28 Drawing Sheets

(51) Int. Cl.
  *G06T 5/50* (2006.01)
  *G06V 40/16* (2022.01)
(52) U.S. Cl.
  CPC .......... *G06V 40/161* (2022.01); *G06V 40/171* (2022.01)

(56) References Cited

U.S. PATENT DOCUMENTS

| | | | |
|---|---|---|---|
| 10,972,788 B1* | 4/2021 | Wang | H04N 19/159 |
| 2018/0173994 A1 | 6/2018 | Rippel et al. | |
| 2018/0174047 A1 | 6/2018 | Bourdev et al. | |
| 2018/0174052 A1 | 6/2018 | Rippel et al. | |
| 2018/0174275 A1 | 6/2018 | Bourdev et al. | |
| 2018/0176570 A1 | 6/2018 | Rippel et al. | |
| 2018/0176576 A1 | 6/2018 | Rippel et al. | |
| 2018/0176578 A1 | 6/2018 | Rippel et al. | |
| 2019/0005305 A1 | 1/2019 | Huang | |
| 2019/0266490 A1 | 8/2019 | Rippel et al. | |
| 2021/0327038 A1* | 10/2021 | Helminger | G06T 9/002 |

FOREIGN PATENT DOCUMENTS

| | | | |
|---|---|---|---|
| CN | 108520503 A | 9/2018 | |
| CN | 109635774 A | 4/2019 | |
| CN | 109886072 A | 6/2019 | |
| CN | 109919888 A | 6/2019 | |
| CN | 110148081 A | 8/2019 | |
| CN | 110826593 A | 2/2020 | |
| WO | WO 2019/147413 A1 | 8/2019 | |
| WO | WO 2020/173329 A1 | 9/2020 | |
| WO | WO 2020/192704 A1 | 10/2020 | |

OTHER PUBLICATIONS

Blanz et al. (Sep. 2003). Reanimating faces in images and video. In Computer graphics forum (vol. 22, No. 3, pp. 641-650). Oxford, UK: Blackwell Publishing, Inc. (Year: 2003).*

International Search Report and Written Opinion for priority appln. No. PCT/CN2020/113305 dated Dec. 7, 2020, 11 p, in Chinese language.

First Office Action and Search Report of Chinese appln. No. 201910935739.4, dated Sep. 3, 2020, 7p, in Chinese language.

Second Office Action of Chinese appln. No. 201910935739.4, dated Oct. 28, 2020, 4p, in Chinese language.

Sakurai, Ryuhei et al., "Synthesis of Expressive Talking Heads from Speech with Recurrent Neural Network", *Journal of Korea Robotics Society*, Dec. 31, 2018, vol. 13(1), 016-025pp, Korea.

Chui, Zhi, "Research on Face Image Aging Method Based on Recurrent Neural Network", Dec. 31, 2018, 1p, China, in Chinese language with English language abstract.

* cited by examiner

TRAINING METHOD AND APPARATUS FOR IMAGE FUSION PROCESSING MODEL, DEVICE, AND STORAGE MEDIUM

RELATED APPLICATIONS

This application is a continuation of the PCT International Patent Application No. PCT/CN2020/113305, entitled "TRAINING METHOD AND APPARATUS AND IMAGE PROCESSING METHOD AND APPARATUS FOR IMAGE FUSION PROCESSING MODEL, AND STORAGE MEDIUM" and filed with the China National Intellectual Property Administration on Sep. 3, 2020, which claims priority to Chinese Patent Application No. 201910935739.4, filed with the National Intellectual Property Administration, PRC on Sep. 29, 2019 and entitled "TRAINING METHOD AND APPARATUS AND IMAGE PROCESSING METHOD AND APPARATUS FOR IMAGE FUSION PROCESSING MODEL, AND STORAGE MEDIUM." The above applications are incorporated by reference in their entireties.

FIELD OF THE TECHNOLOGY

This application relates to image processing technologies, and in particular, to a training method and apparatus and an image processing method and apparatus for an image fusion processing model, an electronic device, and a storage medium.

BACKGROUND OF THE DISCLOSURE

In applications such as movie special effect and social networking, there is a need to replace a to-be-replaced face with a face of another person (also referred to as a target face) while a style of the face of the person (also referred to as the to-be-replaced face) in an original image (for example, a picture or a video frame) is maintained. Therefore, artificial intelligence technology provides a solution to train a proper image processing model to support the above application.

The image processing model is trained based on a specific to-be-replaced face and a specific target face. When the to-be-replaced face is updated along with all parameters in the image processing model being updated, the efficiency of training the image processing model is affected. The online efficiency of the image processing model in a production environment to implement the above application is then, affected. Meanwhile, a large quantity of hardware resources are occupied in the process of updating the all parameters in the image processing model, resulting in an increase in the costs of hardware devices, which is disadvantageous to the large range deployment of the image processing model.

SUMMARY

In view of this, embodiments of this disclosure provide a training method and apparatus and an image processing method and apparatus for an image fusion processing model, an electronic device, and a storage medium, to improve efficiency of training an image fusion processing model while ensuring a recognition precision of an image processing model, and process images in batches. Complexity of a trained fusion image processing model is low, storage resources are saved, and online of the image processing model in a production environment is implemented to improve efficiency of application. Meanwhile, in a process of updating all parameters in the image processing model, occupation of hardware resources is reduced, and an increase in the costs of hardware devices is reduced, thereby implementing a large range deployment of the image processing model.

An embodiment of this disclosure provides a training method for an image fusion processing model, including: obtaining an image set, and compressing the image set, to form an original image set including at least one group of compressed face images; updating a parameter of an encoder of a single image processing model and a parameter of a decoder of the single image processing model according to a single to-be-replaced face in the original image set, so that the decoder of the single image processing model is capable of performing decoding based on a style feature of the single to-be-replaced face, and obtaining, through decoding, a single target face having the same style as the single to-be-replaced face; and updating parameters of an encoder and a decoder that are of the image fusion processing model according to different to-be-replaced faces and different target faces that are in the original image set while the parameters of the encoder and the decoder that are of the single image processing model maintain unchanged, so that the decoder of the image fusion processing model is capable of performing decoding based on style features of the different to-be-replaced faces, and obtaining, through decoding, different target faces having the same style as the corresponding to-be-replaced faces.

Another embodiment of this disclosure further provides an image processing method for an image fusion processing model, including: encoding an original image set by using a state encoder of the image fusion processing model to obtain style features of different to-be-replaced faces in the original image set; encoding different target faces by using a facial encoder of the image fusion processing model to obtain facial features corresponding to the different target faces; inputting the style features and the facial features into a fusion decoder of the image fusion processing model; and performing decoding in the fusion decoder based on the style features of the different to-be-replaced faces and the facial features of the different target faces to obtain different target faces having the same style as the different to-be-replaced faces; parameters of the encoder and the decoder that are of the image fusion processing model being obtained by performing updating according to a single target image while parameters of an encoder and a decoder that are of a single image processing model maintain unchanged.

Another embodiment of this disclosure further provides a training apparatus for an image fusion processing model, including: an image processing module, configured to obtain an image set and compress the image set to form an original image set including at least one group of compressed face images; a single image processing model training module, configured to update a parameter of an encoder of a single image processing model and a parameter of a decoder of the single image processing model according to a single to-be-replaced face in the original image set, so that the decoder of the single image processing model is capable of performing decoding based on a style feature of the single to-be-replaced face, and obtaining, through decoding, a single target face having the same style as the single to-be-replaced face; and an image fusion processing model training module, configured to update parameters of an encoder and a decoder that are of the image fusion processing model according to different to-be-replaced faces and different target faces that are in the original image set while the parameters of the encoder and the decoder that are of the single image processing model maintain unchanged, so that the decoder of the image fusion processing model is capable of performing decoding based on style features of the different to-be-replaced faces, and obtaining, through decoding, different target faces having the same style as the corresponding to-be-replaced faces.

Another embodiment of this disclosure further provides an image processing apparatus, including: an encoder module, configured to encode an original image set by using a state encoder of an image fusion processing model to obtain style features of different to-be-replaced faces in the original image set; the encoder module being configured to encode different target faces by using a facial encoder of the image fusion processing model to obtain facial features corresponding to the different target faces; a decoder module, configured to input the style features and the facial features into a fusion decoder of the image fusion processing model; and the decoder module being configured to perform decoding in the fusion decoder based on the style features of the different to-be-replaced faces and the facial features of the different target faces, to obtain different target faces having the same style as the different to-be-replaced faces; parameters of the encoder and the decoder that are of the image fusion processing model being obtained by performing updating according to a single target image while parameters of an encoder and a decoder that are of a single image processing model maintain unchanged.

Another embodiment of this disclosure further provides an electronic device, including: a memory configured to executable instructions; and a processor configured to implement, when executing the executable instructions stored in the memory, the foregoing training method for an image fusion processing model.

Another embodiment of this disclosure further provides an electronic device, including: a memory, configured to executable instructions; and a processor, configured to implement, when executing the executable instructions stored in the memory, the foregoing image processing method.

Another embodiment of this disclosure further provides a computer-readable storage medium, storing executable instructions, the executable instructions, when executed by a processor, implementing the foregoing training method for an image fusion processing model or the foregoing image processing method.

When some embodiments of this disclosure is applied, an image set is obtained, and the image set is compressed, to form an original image set including at least one group of compressed face images; a parameter of an encoder of a single image processing model and a parameter of a decoder of the single image processing model are updated according to a single to-be-replaced face in the original image set, so that the decoder of the single image processing model is capable of performing decoding based on a style feature of the single to-be-replaced face, and a single target face having the same style as the single to-be-replaced face is obtained through decoding; and parameters of an encoder and a decoder that are of the fusion image processing model are updated according to different to-be-replaced faces and different target faces that are in the original image set in a case that the parameters of the encoder and the decoder that are of the single image processing model maintain unchanged, so that the decoder of the fusion image processing model is capable of performing decoding based on style features of the different to-be-replaced faces, and different target faces having the same style as the corresponding to-be-replaced faces are obtained through decoding. Therefore, training of the decoder of the image fusion processing model and decoupling of the original image set are implemented. Complexity of the image fusion processing model is reduced, and hardware storage resources are saved. The trained image fusion processing model can process different original images in batches, thereby enhancing universality of the image fusion processing model. Meanwhile, in a process of updating all parameters in the image processing model, occupation of hardware resources is reduced. An increase in the costs of hardware devices is also reduced. Larger range deployment of the image processing model is implemented, thereby facilitating deployment of the image processing model in a mobile terminal, and reducing use costs of a user.

DESCRIPTION OF EMBODIMENTS

Figure 1:
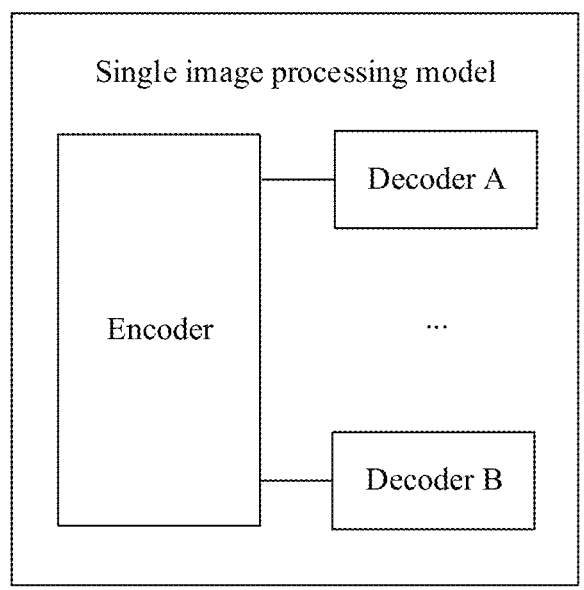
FIG. 1 is a schematic structural diagram of an image processing model according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art without creative efforts shall fall within the protection scope of this disclosure.

In the following descriptions, related "some embodiments" describe a subset of all possible embodiments. However, it may be understood that the "some embodiments" may be the same subset or different subsets of all the possible embodiments, and may be combined with each other without conflict.

Before the embodiments of this disclosure are further described in detail, a description is made on nouns and terms involved in the embodiments of this disclosure, and the nouns and terms involved in the embodiments of this disclosure are applicable to the following explanations.

(1) An original image set is also referred to as an original face image, that is, an image set including a to-be-replaced face, for example, a picture set or a frame image set of a video.

(2) A target image is also referred to as a target face image, that is, includes an image used for replacing the "to-be-replaced face," for example, a picture or a frame image in a video.

(3) An encoder is configured as a model for performing feature dimension reduction (that is, reducing a dimension of a feature, also referred to as encoding or feature extraction) on the to-be-replaced face in the original image set, and outputting a feature for representing a style of the to-be-replaced face.

(4) A style feature, that is, a feature with obviously identifiability that is shown by the to-be-replaced face visually and that is extracted from the to-be-replaced face of the original image set based on an intermediate layer (a hidden layer) of the encoder, may include an expression, a manner, illumination, a mouth, a line-of-sight direction, closing eyes or not, a skin color, and the like.

(5) A decoder is a model that is in a one-to-one correspondence with a target face, and is configured to restore (also referred to as decode or reconstruct) a style feature inputted into the decoder to an image of the target face having a corresponding style feature.

(6) Face changing, that is, the to-be-replaced face in the original image set is replaced with a target face having the same style feature as the to-be-replaced face.

(7) A single image processing model can process only one image each time. If different images need to be processed, different single image processing models need to be trained.

(8) An image fusion processing model can process at least two images each time, and may process images in the original image set in batches according to an instruction of a user or a preset program.

(9) Transaction is equal to a computer term "transaction." The transaction includes an operation that needs to be submitted to a blockchain network for execution and does not mean transaction in a business context only. Considering that the term "transaction" is conventionally used in a blockchain technology, the embodiment of this disclosure follows the habit.

(10) A blockchain is an encrypted chain storage structure for transaction formed by a block.

(11) A blockchain network is a set of a series of nodes in which a new block is added into a blockchain in a consensus manner.

(12) A ledger is a collective name of a blockchain (also referred to as ledger data) and a state database synchronized with the blockchain.

(13) A smart contract, also referred to as chaincode or application code, is a program deployed in a node of the blockchain network. The node performs the smart contract invoked in a received transaction to perform an operation of updating or querying on key-value pair data of the state database.

(14) A consensus is a process in the blockchain network and is used for reaching consistency in transactions in blocks among a plurality of related nodes. The consistent blocks are appended to a tail of the blockchain. A mechanism for reaching the consensus includes a proof of work (PoW), a proof of stake (PoS), a delegated proof of stake (DPoS), and a proof of elapsed time (PoET).

FIG. 1 is a schematic structural diagram of a single image processing model according to an embodiment of this disclosure. The single image processing model includes an encoder and a decoder. The decoder is in a one-to-one correspondence with a single target face for replacing a "single to-be-replaced face." The single to-be-replaced face may be understood that there are a to-be-replaced face A in an original image set and a target face B, and the to-be-replaced face in the original image set is replaced with a target face having the same style feature as the to-be-replaced face, to implement that the to-be-replaced face A has a style feature of the target face B. Therefore, a quantity of decoders in the single image processing model depends on a quantity of different single target faces (for example, different faces) that need to be processed by the single image processing model. For example, when the single image processing model needs to replace a single to-be-replaced face in a video with two different target faces, the decoders corresponding to the two different target faces need to be set in the single image processing model.

Figure 2:
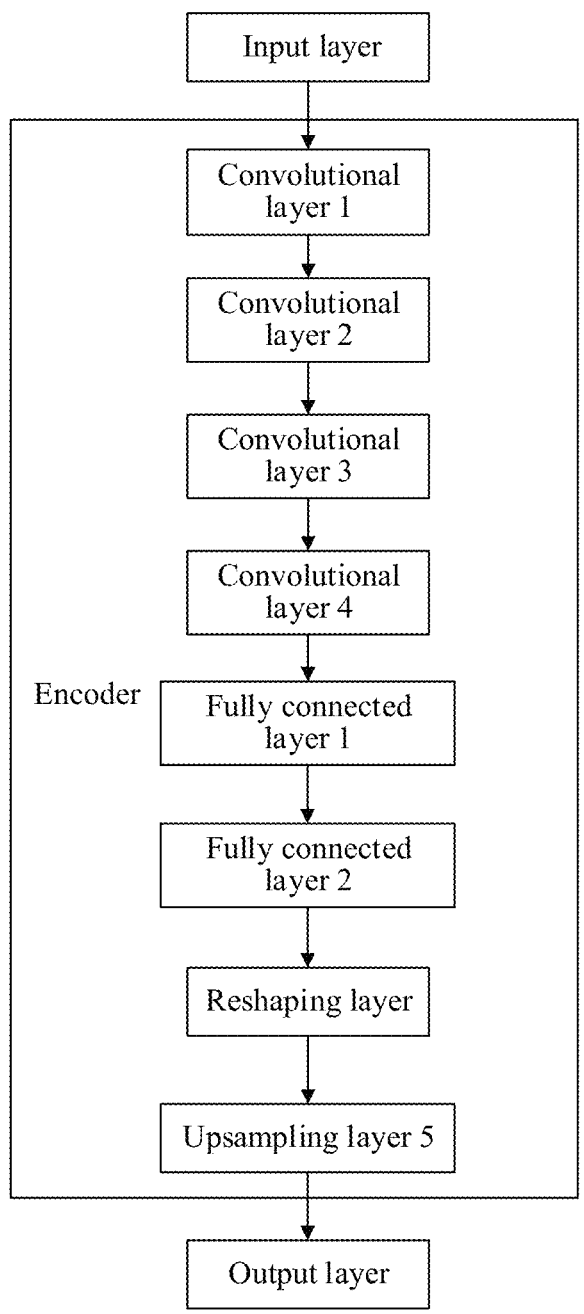
FIG. 2 is an exemplary structural diagram of an encoder according to an embodiment of this disclosure.

FIG. 2 is an exemplary structural diagram of an encoder according to an embodiment of this disclosure. As shown in FIG. 2, the encoder includes four convolutional layers, two fully-connected layers, one reshaping layer, and one upsampling layer, and exemplary parameters of the layers are shown in Table 1. A layer type and a quantity of channels that are in the encoder are changed variously, and this is not limited to what are shown in FIG. 2 and Table 1.

TABLE 1

| Layer type | Quantity of channels | Convolution kernel | Step | Filler | Activation function |
|---|---|---|---|---|---|
| Input layer | 3 | — | — | — | — |
| Convolutional layer 1 | 128 | (5, 5) | (2, 2) | Same pixel | Parametric rectified linear unit (pReLU) |
| Convolutional layer 2 | 256 | (5, 5) | (2, 2) | Same pixel | pReLU |
| Convolutional layer 3 | 512 | (5, 5) | (2, 2) | Same pixel | pReLU |
| Convolutional layer 4 | 1024 | (5, 5) | (2, 2) | Same pixel | pReLU |
| Fully connected layer 1 | 1024 | (5, 5) | — | — | pReLU |
| Fully connected layer 2 | 16384 | (5, 5) | — | — | pReLU |
| Reshaping layer | — | (4, 4, 1024) | — | — | — |
| Upsampling layer 1 | 512 | (3, 3) | (2, 2) | Same pixel | pReLU |

Figure 3:
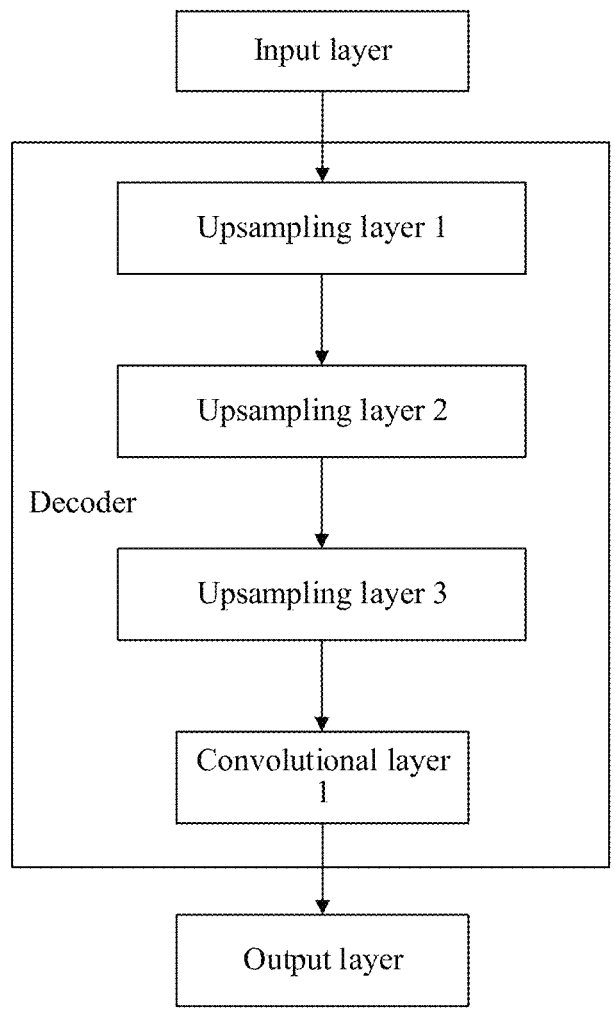
FIG. 3 is an exemplary structural diagram of a decoder according to an embodiment of this disclosure.

FIG. 3 is an exemplary structural diagram of a decoder according to an embodiment of this disclosure. As shown in FIG. 3, the decoder includes three upsampling layers and one convolutional layer, and exemplary parameters of the layers of the decoder are shown in Table 2. A layer type and a quantity of channels that are in the decoder are changed variously, and this is not limited to what are shown in FIG. 3 and Table 2.

TABLE 2

| Layer type | Quantity of channels | Convolution kernel | Step | Filler | Activation function |
|---|---|---|---|---|---|
| Input layer | 512 | — | — | — | — |
| Upsampling layer 1 | 256 | — | (2, 2) | Same pixel | pReLU |
| Upsampling layer 2 | 128 | (3, 3) | (2, 2) | Same pixel | pReLU |
| Upsampling layer 3 | 64 | (3, 3) | (2, 2) | Same pixel | pReLU |
| Convolutional layer 4 | 3 | (3, 3) | (2, 2) | Same pixel | — |

Figure 4:
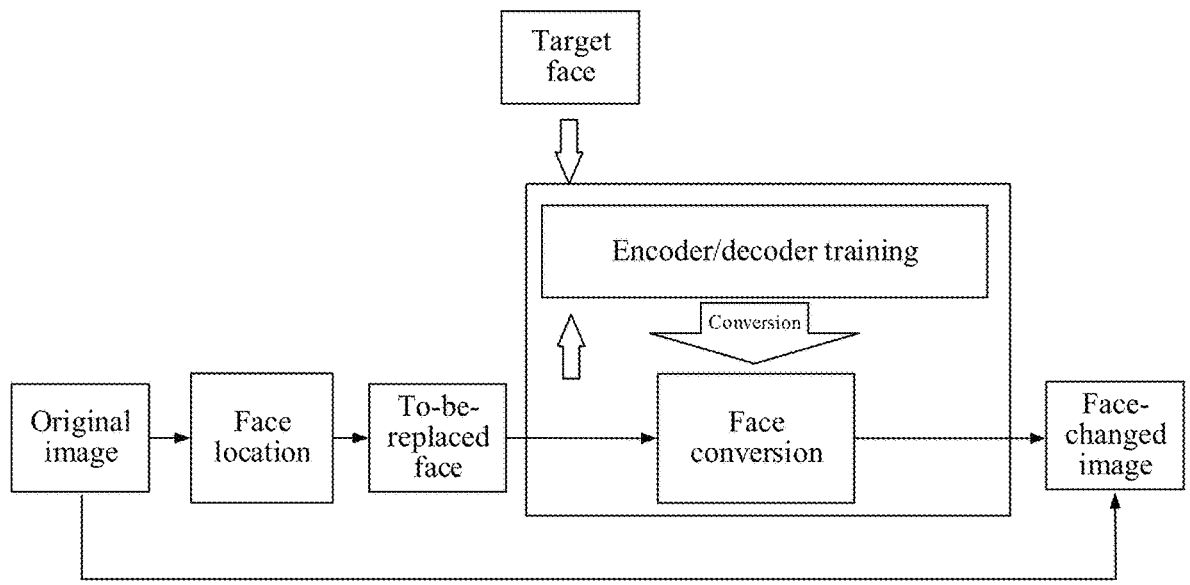
FIG. 4 is a schematic principle diagram of performing face changing by an image processing model according to an embodiment of this disclosure.

FIG. 4 is a schematic principle diagram of performing face changing by a single image processing model according to an embodiment of this disclosure. After an encoder and a decoder are trained, the encoder extracts a style feature from a to-be-replaced face of the original image set (that is, performs encoding on the to-be-replaced face). The style feature is inputted into the decoder for decoding. The decoding process is a process of face conversion, and a formed new face-changed image includes a facial feature of a target face and a style of the to-be-replaced face, for example, an expression and a manner.

Figure 5:
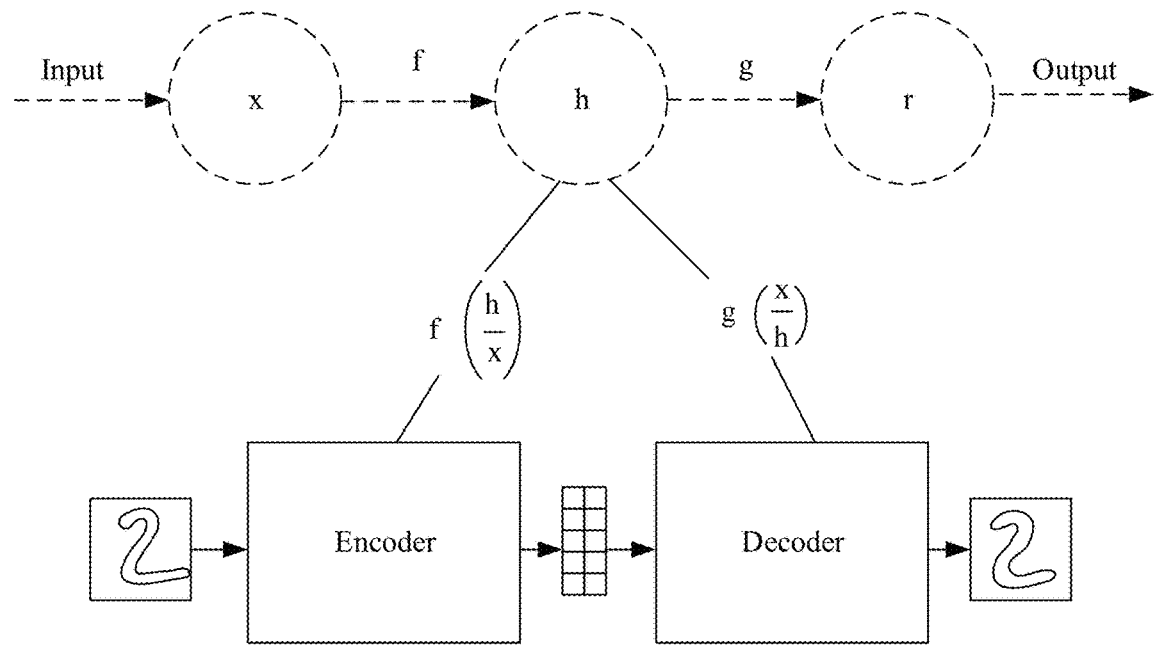
FIG. 5 is a schematic principle diagram of performing face changing by an image processing model according to an embodiment of this disclosure.

FIG. 5 is a schematic principle diagram of performing face changing by a single image processing model according to an embodiment of this disclosure. The symbol x denotes an inputted single to-be-replaced face. An encoding function of an encoder for x may be represented as $f(h/x)$, and a corresponding encoding result is $f(h/x)*x$. Therefore, x is encoded as an implicit feature h, representing a style, and a dimension of the feature h is less than a dimension of x. Therefore, it may also be considered that the single to-be-replaced face is expressed in a compression manner. A decoding function of a decoder may be represented as $g(x/h)$. Decoding is performed according to an inputted feature h, and a reconstructed single to-be-replaced face r obtained through decoding may be represented as $g(x/h)*h$.

When the single image processing model includes two or more decoders (like the decoder A and the decoder B as exemplarily shown in FIG. 1), the decoders share the same encoder.

For example, assuming that a single target face of the decoder A is a face of an object A and a single target face of the decoder B is a face of an object B, for a style feature obtained by encoding a single to-be-replaced face in the same original image set (an object C) by the encoder, the decoder A may perform decoding based on the style feature to obtain, through reconstruction, a single target face A having the same style feature. The decoder B may perform decoding based on the style feature to obtain, through reconstruction, a single target face B having the same style feature.

The object may be any creature (including a person and an animal) having five sense organs. A face is used as an example to continuously describe a processing process of the single image processing model according to the embodiment of this disclosure.

Figure 6:
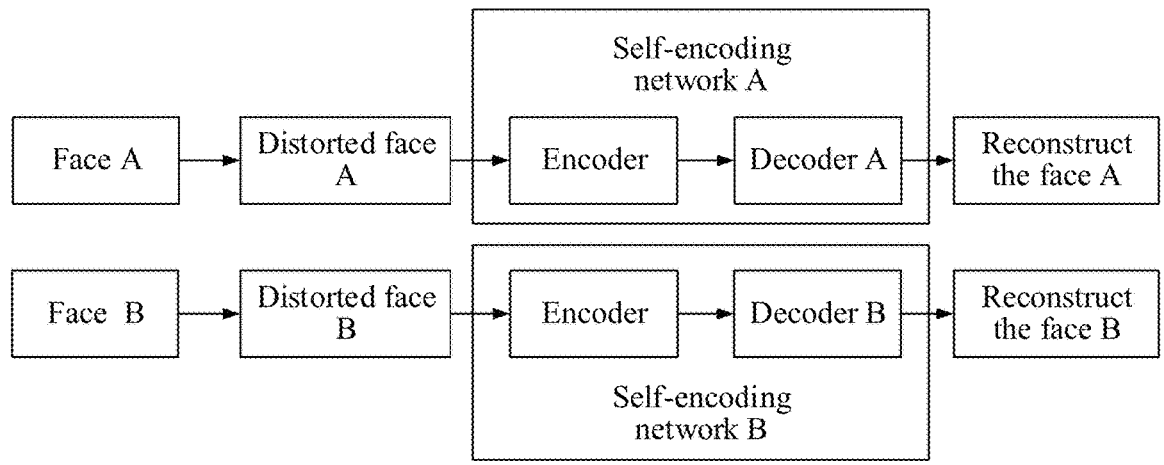
FIG. 6 is a schematic principle diagram of a training method provided by applying an image processing model to a related technology according to an embodiment of this disclosure.

FIG. 6 is a schematic principle diagram of a training method provided by applying a single image processing model to a related technology according to an embodiment of this disclosure. The training method in FIG. 6 exemplarily uses face A and face B as target faces. An encoder and a decoder A form a self-encoding network A, and the self-encoding network A is trained without supervision based on distorted images of different sample images (for example, sample images with different resolutions and different styles) of the face A to update parameters of the encoder and the decoder A until the decoder is capable of decoding the face A to obtain a dimension-reduced feature of the face A. The decoder A is configured to perform decoding based on the dimension-reduced feature of the face A to reconstruct an image of the face A. A self-encoding network B is trained without supervision based on distorted images of different sample images of the face B, to update parameters of the encoder and the decoder B, until the decoder is capable of decoding the face B to obtain a dimension-reduced feature of the face B. The decoder B is configured to perform decoding based on the dimension-reduced feature of the face B to reconstruct an image of the face B.

It may be learned that, for training of the single image processing model shown in FIG. 1, the application of the training method provided by the related technology relates to training of the self-encoding network A and the self-encoding network B. In a process of training each self-encoding network, the parameters of the encoder and the decoder need to be updated separately. Description is provided below.

In a process of training the self-encoding network A, a loss function of the self-encoding network A is represented as:

$$\mathrm{loss\_}A = \Sigma(\mathrm{decoder\_}A(\mathrm{encoder}(\mathrm{warp}(x_1))) - x_1)^2,$$

where "decoder_A" is the decoder A, "warp" is a function of a distorted face, "$x_1$" is the face A, and "encoder" is the encoder of the self-encoding network A.

In an iterative training process, the face A is substituted into the loss function of the self-encoding network A to solve the parameters of the encoder and the decoder A when the loss function descends according to a gradient (for example, a maximum gradient). When the loss function converges, the training ends.

In a process of training the self-encoding network B, a loss function of the self-encoding network B is represented as:

$$\mathrm{loss\_}B = \Sigma(\mathrm{decoder\_}B(\mathrm{encoder}(\mathrm{warp}(x_2))) - x_2)^2,$$

where "decoder_B" is the decoder B, "warp" is a function of a distorted face, "$x_2$" is the face B, and "encoder" is the encoder of the self-encoding network B.

In an iterative training process, the face B is substituted into the loss function of the self-encoding network B, to solve the parameters of the encoder and the decoder B when the loss function descends according to a gradient (for example, a maximum gradient). When the loss function converges, the training ends.

With reference to the foregoing analysis, the application of the related technology in training the single image processing model according to this embodiment of this disclosure has the following problems:

1. Adjustment costs of the single image processing model are high.

After a single image processing model for the target faces (the face A and the face B) is formed, if the single image processing model needs to further process target faces (a face C and a face D, for example) for face changing, parameters of self-encoding networks, separately formed by the encoder and the face C as well as the face D, need to be adjusted by using samples of the face C and the face D. Because the encoder and the decoder are connected in series, the gradient becomes quite small when being propagated from the decoder to the encoder. Consequently, a plurality of times of iterative training need to be performed, which consumes relatively long time.

2. A requirement for a data volume for training is high, and a relatively large number of storage resources are occupied in a deployment stage.

Because there are a plurality of parameters of the encoder, a plurality of training samples need to be provided for training of the encoder in the training process. For example, when the to-be-replaced face needs to be replaced with the target face, a large quantity of samples of the target face needs to be acquired, including different angles, expressions, illumination, and the like. It is usually difficult to obtain such rich samples, resulting in affecting an effect of face changing of the single image processing model. Meanwhile, because the image processing model is capable of only processing a single image, when a user needs to process a plurality of different images, a plurality of single image processing models need to be deployed. During deployment, storage complexity is relatively high, and a large quantity of storage resources is occupied.

3. A conventional face changing model only supports the processing of face changing of a single person. If a new face needs to be changed, a new model needs to be trained, which is time-consuming and troublesome. Each model needs to occupy respective storage space, and the process is complex. The time consumption of the entire face changing processing flow is increased, and user experience is affected. Meanwhile, training a single face changing model requires 100 or more pictures (face images) as training samples, and users of the face changing model often do not provide their own face images as training samples for privacy reasons, affecting dispersion of the training sample image.

Figure 7:
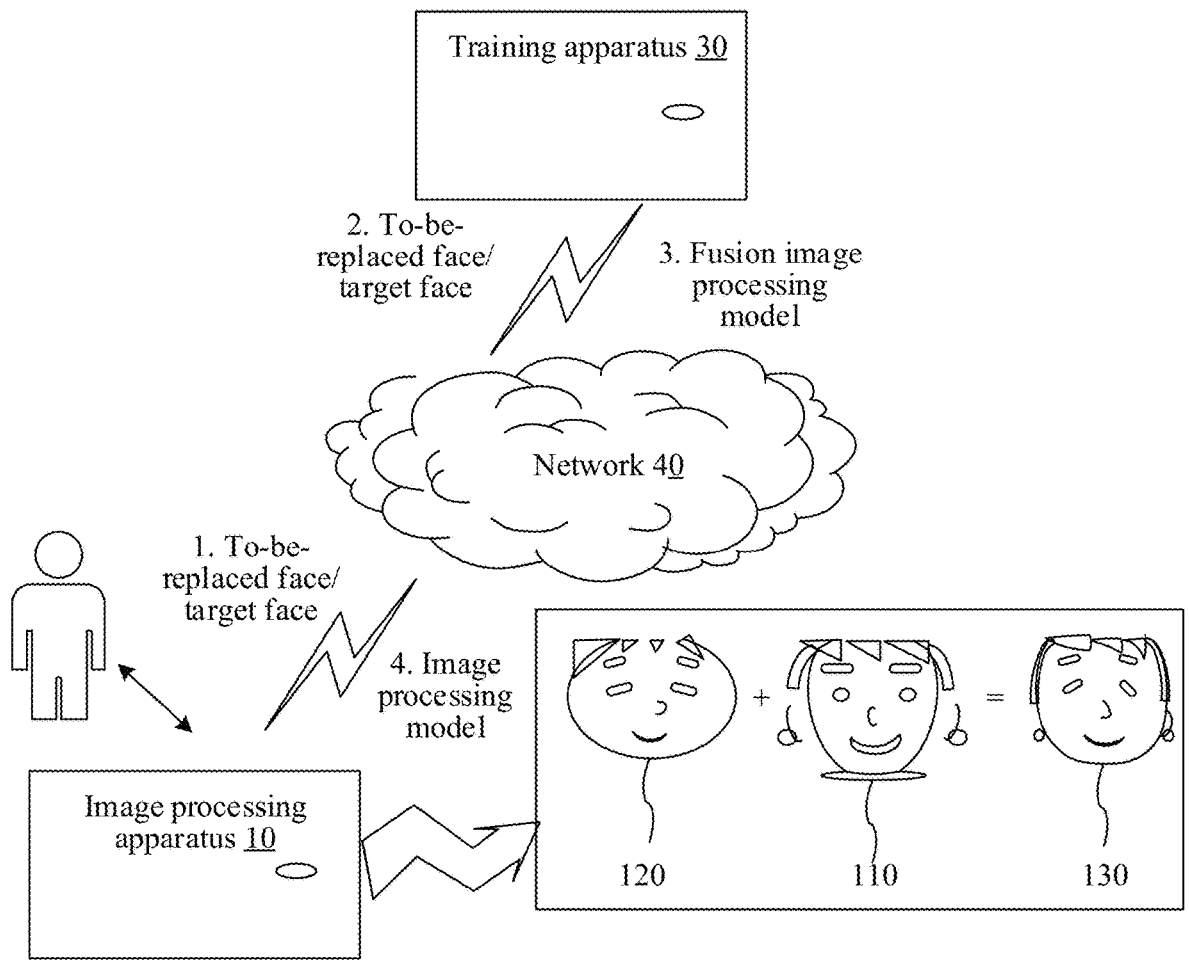
FIG. 7 is a schematic diagram of use scenarios of a training method and application method for an image fusion processing model according to an embodiment of this disclosure.

On the other hand, the embodiment of this disclosure provides a training method and apparatus for an image fusion processing model and an image processing method and apparatus for an image fusion processing model. For example, FIG. 7 is a schematic diagram of use scenarios of a training method and an application method for an image fusion processing model according to an embodiment of this disclosure. To support an exemplary application, a training apparatus 30 for an image fusion processing model for implementing this embodiment of this disclosure may be a server, and an image processing apparatus 10 for implementing this embodiment of this disclosure may be a terminal running various clients. The training apparatus 30 is connected to the image processing apparatus 10 through a network 40, and the network 40 may be a wide area network, a local area network, or a combination of the wide area network and the local area network, in which the data transmission is implemented by using a radio link. The image processing apparatus 10 submits training tasks for different fusion target faces, the training apparatus 30 trains a corresponding image fusion processing model, and a corresponding server delivers parameters of the image fusion processing model to the training apparatus 30.

For example, a video client may be run in a graphic interface of the image processing apparatus 10, and the video client is capable of submitting a corresponding training task to the training apparatus 30 according to a to-be-replaced face 120 and a target face 110 that are indicated by a user in a playing interface in various interactive manners between the user and the device (for example, a gesture and a voice). The training apparatus 30 completes the training task of the image fusion processing model and delivers a corresponding parameter to the video client. The video client reconstructs a target face 130, having the same style as the to-be-replaced face 120, by running the image fusion processing model. In a frame image of the to-be-replaced face 120 appearing after decoding, the to-be-replaced face 120 in a video is replaced with the reconstructed target face 130 to form a face-changing effect of the video.

It may be understood that the video decoding processing may also be migrated to the server. The replaced frame image is re-encoded by using a hardware resource of the server to form a video having a face-changing effect.

Figure 8:
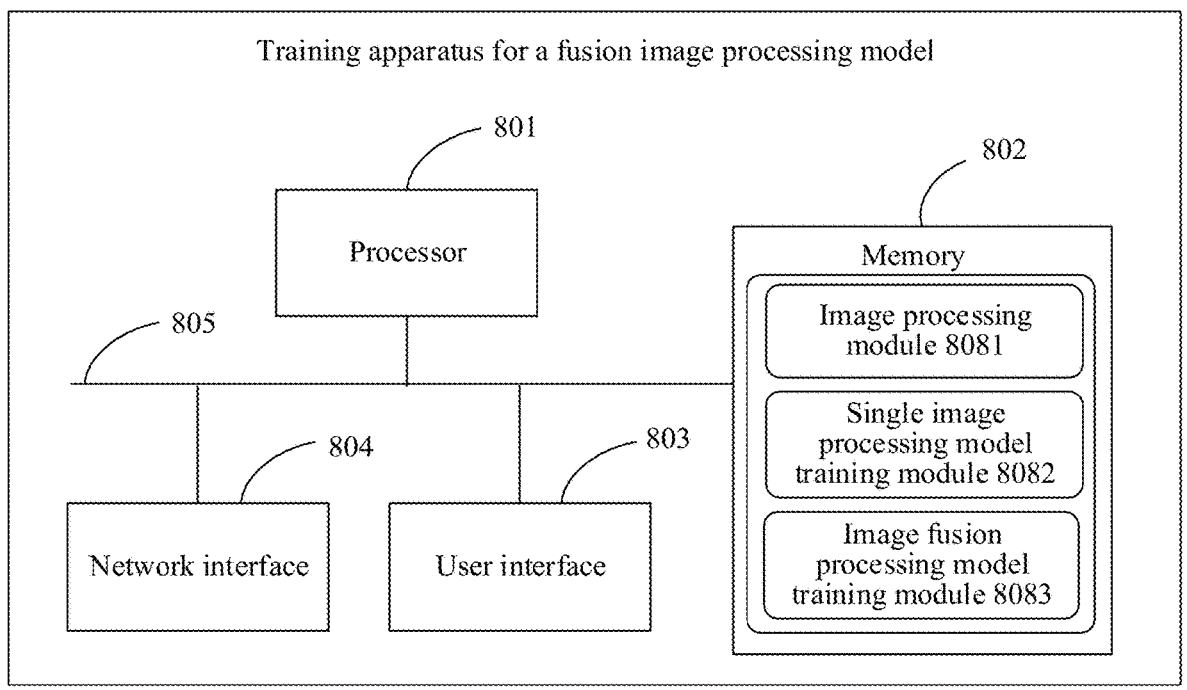
FIG. 8 is a schematic structural diagram of a training apparatus for training an image fusion processing model according to an embodiment of this disclosure.

A hardware structure of the training apparatus for implementing this embodiment of this disclosure is continued to be described according to a target accompanying drawing, and the training apparatus for implementing this embodiment of this disclosure may be a server or various types of terminals. FIG. 8 is a schematic structural diagram of a training apparatus 30 for training an image fusion processing model according to an embodiment of this disclosure. Description is provided with reference to a structure shown in FIG. 8.

The following describes a structure of the training apparatus for an image fusion processing model according to the embodiment of this disclosure in detail. The training apparatus for an image fusion processing model may be implemented in various forms, for example, a terminal with an image fusion processing model training apparatus or a server provided with an image fusion processing model training function. The terminal with an image fusion processing model training apparatus may be the electronic device with an image fusion processing model training apparatus in the foregoing embodiment, for example, the foregoing server in FIG. 7. FIG. 8 is a schematic structural diagram of compositions of a training apparatus for an image fusion processing model according to an embodiment of this disclosure. It may be understood that FIG. 8 shows only an exemplary structure rather than all structures of the training apparatus for an image fusion processing model. A part of the structure or the entire structure shown in FIG. 8 may be implemented based on needs.

The training apparatus for an image fusion processing model provided in this embodiment of this disclosure includes the following components: at least one processor 801, a memory 802, a user interface 803, and at least one network interface 804. Various assemblies in the training apparatus for an image fusion processing model are coupled together via a bus system 805. It may be understood that the bus system 805 is configured to implement connection and communication between these assemblies. In addition to a data bus, the bus system 805 further includes a power bus, a control bus, and a state signal bus. However, for ease of clear description, all types of buses in FIG. 8 are marked as the bus system 805.

The user interface 803 may include a display, a keyboard, a mouse, a trackball, a click wheel, a key, a button, a touchpad, or a touch screen.

It may be understood that the memory 802 may be a volatile memory or a non-volatile memory or may include both a volatile memory and a non-volatile memory. The memory 802 in the embodiment of this disclosure can store data to support operation of the terminal (for example, 10-1). Examples of these types of data include any computer program to be operated on the terminal (for example, 10-1), for example, an operating system and an application program. The operating system includes various system programs, such as framework layers, kernel library layers, and driver layers configured to implement various basic services and process hardware-based tasks. The application program may include various application programs.

In some embodiments, the training apparatus for an image fusion processing model provided in the embodiment of this disclosure may be implemented by a combination of software and hardware. For example, the training apparatus for an image fusion processing model provided in the embodiment of this disclosure may be a processor in the form of a hardware decoding processor, and the training apparatus is programmed to perform the training method for an image fusion processing model provided in the embodiment of this disclosure. For example, the processor in the form of a hardware decoding processor may use one or more application-specific integrated circuits (ASIC), a DSP, a programmable logic device (PLD), a complex PLD (CPLD), a field programmable gate array (FPGA), or another electronic element.

For example, the training apparatus for an image fusion processing model provided in the embodiment of this disclosure is implemented by a combination of software and hardware. The training apparatus for an image fusion processing model provided in the embodiment of this disclosure may be directly embodied as a combination of software modules executed by the processor 801. The software module may be located in a storage medium. The storage medium is located in the memory 802, and the processor 801 reads executable instructions included in the software module in the memory 802. The training method for an image fusion processing model provided in the embodiment of this disclosure is completed in combination with necessary hardware (for example, including a processor 801 and another assembly connected to the bus 805).

For example, the processor 801 may be an integrated circuit chip, and has a signal processing capability, such as a general purpose processor, a digital signal processor (DSP), or another programmable logical device, a discrete gate or a transistor logical device, or a discrete hardware component. The general purpose processor may be a microprocessor, any conventional processor, or the like.

For example, the training apparatus for an image fusion processing model provided in the embodiment of this disclosure is implemented by hardware. The apparatus provided in the embodiment of this disclosure may be directly executed and completed by using the processor 801 in the form of the hardware decoding processor. For example, it may be implemented by one or more application-specific integrated circuits (ASICs), a DSP, a programmable logic device (PLD), a complex programmable logic devices (CPLD), a field-programmable gate array (FPGA), or another electronic element to implement the training method for an image fusion processing model provided in the embodiment of this disclosure.

The memory 802 in this embodiment of this disclosure is configured to store various types of data to support operation of the training apparatus for an image fusion processing model. Examples of these types of data include any executable instruction to be operated on the training apparatus for an image fusion processing model, such as an executable instruction. A program for implementing the training method for an image fusion processing model of the embodiment of this disclosure may be included in the executable instruction.

In some other embodiments, the training apparatus for an image fusion processing model provided in the embodiment of this disclosure may be implemented by software. FIG. 8 shows the training apparatus for an image fusion processing model stored in the memory 802, which may be software in the form of a program and a plug-in and includes a series of modules. An example of a program stored in the memory 802 may include a training apparatus for an image fusion processing model. The training apparatus for an image fusion processing model includes the following software modules: an image processing module 8081, a single image processing model training module 8082, and an image fusion processing model training module 8083. When the software modules in the training apparatus for an image fusion processing model are read by the processor 801 into a RAM for execution, the training method for an image fusion processing model provided in the embodiment of this disclosure is implemented. Functions of the software modules in the training apparatus for an image fusion processing model are described in the following:

The image processing module 8081 is configured to obtain an image set and compress the image set to form an original image set including at least one group of compressed face images.

The single image processing model training module 8082 is configured to update a parameter of an encoder of a single image processing model and a parameter of a decoder of the single image processing model according to a single to-be-replaced face in the original image set, so that the decoder of the single image processing model is capable of perform decoding based on a style feature of the single to-be-replaced face, and obtaining, through decoding, a single target face having the same style as the single to-be-replaced face.

The image fusion processing model training module 8083 is configured to update parameters of an encoder and a decoder of the image fusion processing model according to different to-be-replaced faces and different target faces that are in the original image set while the parameters of the encoder and the decoder of the single image processing model maintain unchanged, so that the decoder in the image fusion processing model is capable of performing decoding based on style features of the different to-be-replaced faces, and obtaining, through decoding, different target faces having the same style as the corresponding to-be-replaced faces.

Figure 9:
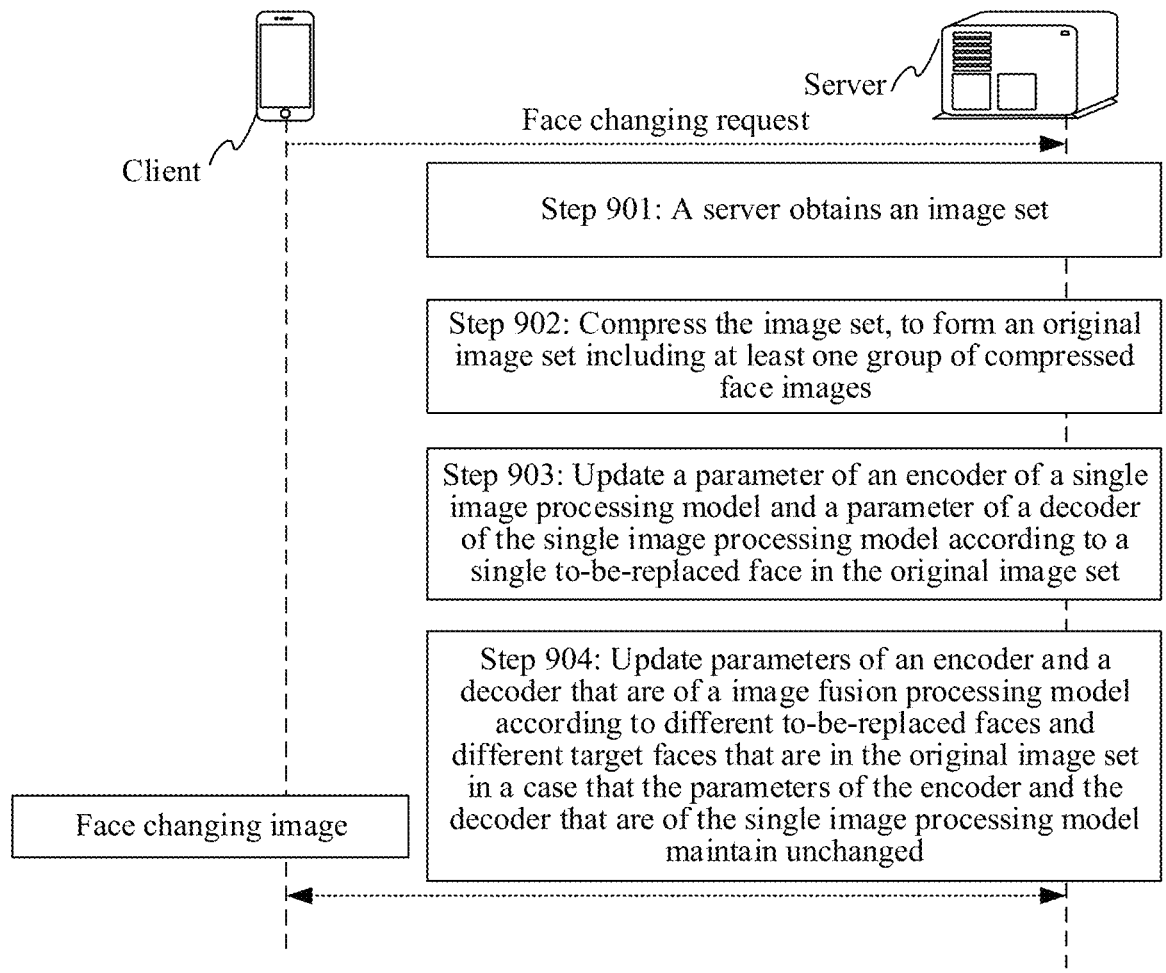
FIG. 9 is an optional schematic flowchart of a training method for an image fusion processing model according to an embodiment of this disclosure.

The training method for an image fusion processing model provided in the embodiment of this disclosure is described with reference to an electronic device shown in FIG. 8. FIG. 9 is an optional schematic flowchart of a training method for an image fusion processing model according to an embodiment of this disclosure. It may be understood that steps shown in FIG. 9 may be performed by electronic devices running the training apparatus for an image fusion processing model, for example, a terminal, a server, or a server cluster having an image fusion processing model training function. The following describes steps shown in FIG. 9:

Step 901. A server obtains an image set.

The obtained images in an original image set may be used as training samples for a single image processing model and an image fusion processing model.

Step 902. Compress the image set, to form an original image set including at least one group of compressed face images.

In some embodiments of this disclosure, before the updating a parameter of an encoder in the single image processing model according to a single to-be-replaced face in the original image set, the method further includes:

capturing, from sample images of a sample image set, the original image set including the single to-be-replaced face; and aligning the captured original image sets based on feature points of the single to-be-replaced face.

In some embodiments of this disclosure, the step of obtaining an image set, and compressing the image set to form an original image set including at least one group of compressed face images may be implemented through the following manners:

crawling an image resource in a network, and performing face feature localization and data cleaning on an original image in the crawled image resource; performing random augmentation on the original image set; performing random distortion on the original image set, on which the random augmentation is performed, to obtain a distorted original image set; capturing a facial image of a single to-be-replaced face in the distorted original image set and performing scaling on the captured facial image to adapt to a resolution of which input is supported by the encoder of the single image processing model; and compressing the facial image on which the scaling is performed, and triggering to form binary data of a face image that is in an undecompressed state and that corresponds to a format of the facial image to use the binary data as the original image set including the at least one group of compressed face images. The binary data of the face image that is in the undecompressed state and that corresponds to the format of the facial image is formed, so that a single face changing model and a fusion face changing model do not need to load all image data in the training process. Corresponding training may be completed by loading the binary data of an image matching the training process in an initial stage of the training, thereby effectively reducing costs of hardware resources caused by a plurality of training images.

In some embodiments of this disclosure, the performing random augmentation on the original image set may be implemented through the following manners:

performing random rotation based on a center of the original image set; performing random scaling on the original image set obtained after the random rotation is performed; and performing random shifting on the original image set obtained after the random scaling is performed.

In some embodiments of this disclosure, the performing random distortion on the original image set on which the random augmentation is performed may be implemented through the following manners:

inserting noise into the original image set on which the random augmentation is performed, the noise including at least one of fixed noise and dynamic noise. Dispersion of the training sample may be effectively improved by inserting the noise into the original image set on which the random augmentation is performed, thereby avoiding parameter distortion of the single face changing model and the fusion face changing model caused by excessively low dispersion of the training sample.

In some embodiments of this disclosure, the inserting noise into the original image set on which the random augmentation is performed may be implemented through the following manners:

performing gridding on the original image set on which the random augmentation is performed and allocating coordinates to at least some nodes in a grid; and adding noise corresponding to the allocated coordinates to the at least some nodes.

Step 903. Update a parameter of an encoder of a single image processing model and a parameter of a decoder of the single image processing model according to a single to-be-replaced face in the original image set.

Therefore, the decoder of the single image processing model may perform decoding based on a style feature of the single to-be-replaced face, and it may obtain, through decoding, a single target face having the same style as the single to-be-replaced face.

In some embodiments of this disclosure, the step of updating the parameter of the encoder of the single image processing model and the parameter of the decoder of the single image processing model according to the single to-be-replaced face in the original image set may be implemented through the following manners:

updating the parameter of the encoder in the single image processing model according to the single to-be-replaced face in the original image set, so that the encoder of the single image processing model is capable of performing encoding on the single to-be-replaced face, and obtaining, through encoding, a style feature of the single to-be-replaced face;

updating the parameter of the decoder in the single image processing model according to the single to-be-replaced face of the original image set, so that the decoder is capable of performing decoding based on the style feature of the single to-be-replaced face; and updating the parameter of the decoder according to a single target face in a single target image while the parameter of the encoder of the single image processing model maintains unchanged, so that the decoder is capable of performing decoding based on the style feature of the single to-be-replaced face, and obtaining, through decoding, a single target face having the same style as the single to-be-replaced face.

In some embodiments of this disclosure, the step of updating the parameter of the encoder in the single image processing model according to the single to-be-replaced face in the original image set may be implemented through the following manners:

substituting a facial image of a single to-be-replaced face in a distorted original image set into a loss function corresponding to a self-encoding network formed by the encoder and the decoder of the single image processing model, and determining, while the loss function satisfies a convergence condition, the parameter corresponding to the encoder of the single image processing model, the distorted original image set being obtained by performing distortion on the original image set.

In some embodiments of this disclosure, the step of updating the parameter of the decoder in the single image processing model according to the single to-be-replaced face of the original image set may be implemented through the following manners:

substituting a facial image of a single to-be-replaced face in a distorted original image set into a loss function corresponding to a self-encoding network formed by the encoder and the decoder of the single image processing model, and determining, while the loss function satisfies a convergence condition, the parameter corresponding to the decoder, the distorted original image set being obtained by performing distortion on the original image set.

In some embodiments of this disclosure, the step of updating the parameter of the decoder according to a style feature of a single target face in a single target image while the parameter of the encoder of the single image processing model maintains unchanged may be implemented through the following manners:

substituting a facial image of a single target face in a distorted single target image into a loss function corresponding to a self-encoding network formed by the encoder and the decoder of the single image processing model, and performing the following processing while the parameter of the encoder corresponding to the single image processing model in the loss function maintains unchanged: determining, while the loss function satisfies a convergence condition, the parameter corresponding to the decoder, the distorted single target image being obtained by performing distortion on the single target image.

The following describes a process of training and applying a single image processing model (also referred to as a face changing model) for exchanging faces. An output result of the decoder of the single image processing model may be used as supervision data for training an image fusion processing model.

Figure 10:
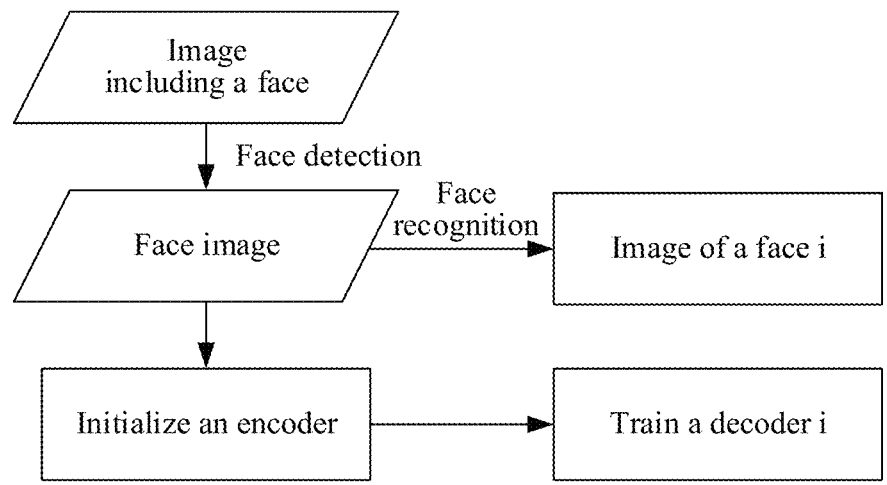
FIG. 10 is a schematic principle diagram of training a single image processing model for exchanging faces according to an embodiment of this disclosure.

FIG. 10 is a schematic principle diagram of training a single image processing model for exchanging faces according to an embodiment of this disclosure. Before the single image processing model is trained, an initial structure of the single image processing model only includes one encoder and one temporary decoder.

During training, initialization is first performed on the encoder. For an image including a face, a face image is captured through face detection. The face image is used as a sample, and a self-encoding network formed by the encoder and the temporary decoder is trained, so that after encoding (that is, feature extraction/dimension reduction) the sample of the face image, the self-encoding network is capable of reconstructing the face image by using a style feature obtained through encoding.

During initialization of the encoder, a parameter of the temporary decoder is also synchronously updated. After the encoder is initialized, different faces recognized from the face image may be used as target faces to train corresponding decoders. The decoders corresponding to different target faces are obtained by training based on the parameter of the temporary decoder after the encoder is initialized.

For example, a decoder i corresponding to a face i is trained (where i is an integer greater than or equal to 1). A parameter of the encoder maintains unchanged. An image of the face i is used as a sample, and the self-encoding network formed by the encoder and the temporary decoder is trained to update the parameter of the temporary decoder. The parameter of the temporary decoder is used as a parameter of the decoder i after training is completed, that is, the decoder i is obtained.

The following separately describes the encoder initialization, training of the decoder for the target face, and corresponding application.

Figure 11A:
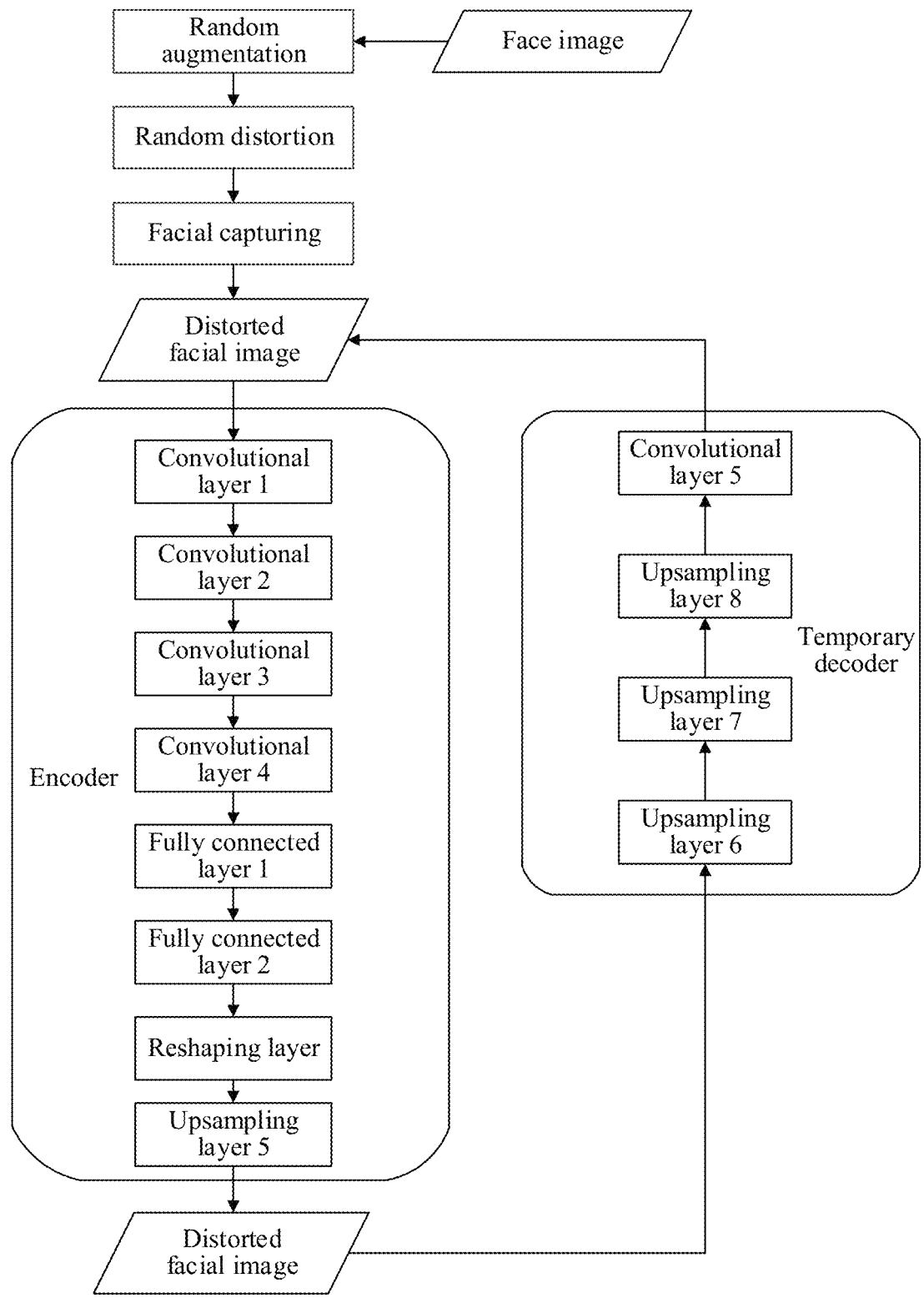
FIG. 11A is a schematic principle diagram of a training method for a single image processing model according to an embodiment of this disclosure.

FIG. 11A is a schematic principle diagram of a training method for a single image processing model according to an embodiment of this disclosure. Descriptions are provided with reference to FIG. 11A.

Before an encoder is initialized, face image data first needs to be obtained by using the following manners: performing box selection on a face position by using a face detection algorithm; marking feature points of a face, such as eyes, a mouth, and a nose, by using a facial feature positioning algorithm; and capturing a face image according to the detected face position and aligning the captured face images based on the feature points (for example, eyes). An exemplary resolution of the face image may be 512*512 (pixel).

Various types of initialization processing is further performed on the face image before the encoder is initialized, including random augmentation, random distortion, and facial feature capturing. Separate descriptions are given below.

Random augmentation includes the following steps: performing random rotation on the face image by centering on an image center, where a rotation angle range being α, for example, a value range of a is 0 degrees to 30 degrees; performing random stretch on a width and a height of the rotated face image, where a straightening multiple being between [1−β, 1+β], for example, 0.01; and performing corresponding random shifting on the face image in a vertical direction and a horizontal direction for θ1 and θ2, in which for example, values of θ1 and θ2 correspond to 1% of the width and 1% of the height of the face image.

After the random augmentation is performed, random distortion processing may be further performed on the face image by using the following manners: drawing a grid; adding coordinate noise; and remapping the image, which are respectively described in the following.

Figure 11B:
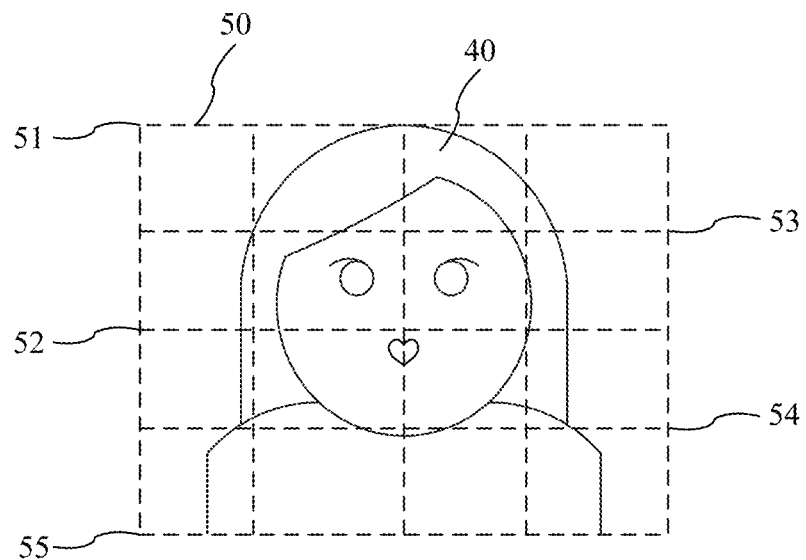
FIG. 11B is a schematic diagram of drawing a grid in a face image according to an embodiment of this disclosure.

FIG. 11B is a schematic diagram of drawing a grid 50 in a face image 40 according to an embodiment of this disclosure. When a grid is drawn, it is assumed that a captured face image 40 is a square image, which is recorded as I, and a width and a height are both W. A uniform grid 50 with density of N (representing an integer of nodes in the grid)*N is drawn in the face image 40, and an example of the density of the grid is 5*5 (that is, there are five nodes in a width direction and five nodes in a height direction). FIG. 11B exemplarily shows a node 51 to a node 55.

When the coordinate noise is added, coordinates (x, y) are allocated to each node. Coordinates of an $i^{th}$ row and a $j^{th}$ column (in FIG. 11B, value ranges of i and j are between 1 and 5) are $(x_{ij}, y_{ij})$, $x_{ij}=i/N$, and $y_{ij}=j/N$. Therefore, all $x_{ij}$ (i=0, . . . , and 4, j=0, . . . , and 4) and $y_{ij}$ (i=0, . . . , and 4, j=0, . . . , and 4) form a matrix (X, Y). Independently distributed Gaussian noise is separately added to each element in (X, Y), where an expectation of the Gaussian noise is 0, a variance is σ2, and an exemplary value of the variance is 0.02. A width and a height of the matrix (X, Y) are enlarged to W, by using an image interpolation method (for example, linear interpolation is used), to obtain a new image (that is, a matrix) (X', Y'). A matrix (X2, Y2) with a width of W and a height of W is constructed, in which an element $x2_{ij}$ of the matrix X2 is equal to i/W, and an element $y2_{ij}=j/W$ in the matrix Y2 is equal to j/W. i=0, . . . , and W, and j=0, . . . , and W.

When the image is remapped, interpolation is performed on the face image, to which the contract noise is added, to obtain a distorted face image Z. A pixel in an $a^{th}$ row and a $b^{th}$ column of Z is recorded as $z_{ab}$, an element less than $x_{ab}$ is searched for from the matrix X2, which is recorded as x2c, and an element less than $y_{ij}$ is searched for from the matrix Y2, which is recorded as $x2_d$. Therefore, the following four points may be constructed: A $(x2_{c, d}, y2_{c, d})$, B $(x2_{c+1, d}, y2_{c+1, d})$, C $(x2_{c, d+1}, y2_{c, d+11})$, D $(x2_{c+1, d+1}, y2_{c+1, d+1})$. Distance dA, dB, dC, and dD between a point $(x_{ab}, y_{ab})$ and A, B, C, and D are separately calculated, and a value of $z_{ab}$ is obtained by weighting according to the four distances: $z_{ab}$=dA/(dA+dB+dC+dD)*$I_{c, d}$+dB/(dA+dB+dC+dD)*$I_{c+1, d}$+dC/(dA+dB+dC+dD)*$I_{c, d+1}$+dD/(dA+dB+dC+dD)*$I_{c+1, d+1}$.

Before the encoder is initialized, facial image capturing needs to be performed on the randomly distorted face image. An image at a fixed location in a middle of the distorted face image is captured, and an example of a percentage of a captured image is 62.5%. Then, the image is scaled to a resolution of which input is supported by the encoder. For example, a width and a height of the randomly distorted image are 512*512. A facial image of which a quantity of columns of the width and a quantity of columns of the height are within (48, 208) is captured, and then an obtained facial image of 161*161 is scaled to a facial image of 64*64.

In a stage of initializing the encoder, initialization processing, such as the random augmentation, the random distortion, and the facial capturing, is performed on all face images detected in a data set to obtain samples of facial images. The samples of the facial images are used for training the self-encoding network shown in FIG. 11A to initialize the encoder. An exemplary structure of the encoder in FIG. 11A is shown in FIG. 2 and Table 1, and it is not limited thereto. For example, channels and a quantity of convolutional layers, fully connected layers, and upsampling layers may be changed flexibly.

A training objective of the self-encoding network is to encode a feature of an input distorted facial image, and then reconstruct the distorted facial image by using the encoded feature. For example, a network of the encoder outputs only 1024 nerve cells, and an input distorted face has 12288 dimensions. The encoder is capable of reserving the feature of the input distorted facial image as much as possible through training, so that when the face changing model is trained subsequently, the parameters of the encoder do not need to be slightly adjusted.

The encoder is recorded as Encoder(x), and x is the input distorted facial image. The temporary decoder is recorded as Decoder_tmp(f), where f is an output (that is Encoder (x)) obtained after x is encoded by the encoder. The loss function Loss_init may be represented as: loss_init=Σ(Decoder_tmp (Encoder(x))−x)$^2$.

When the loss_init is not remarkably reduced (that is, less than a threshold of the loss function) during optimization, or when a quantity of times of iteration reaches a threshold of the quantity of times of iteration, initialization of the encoder is completed. The encoder already has a capability of encoding any input face image to obtain a style feature, and further adjustment does not need to be performed on the parameter subsequently.

Figure 12:
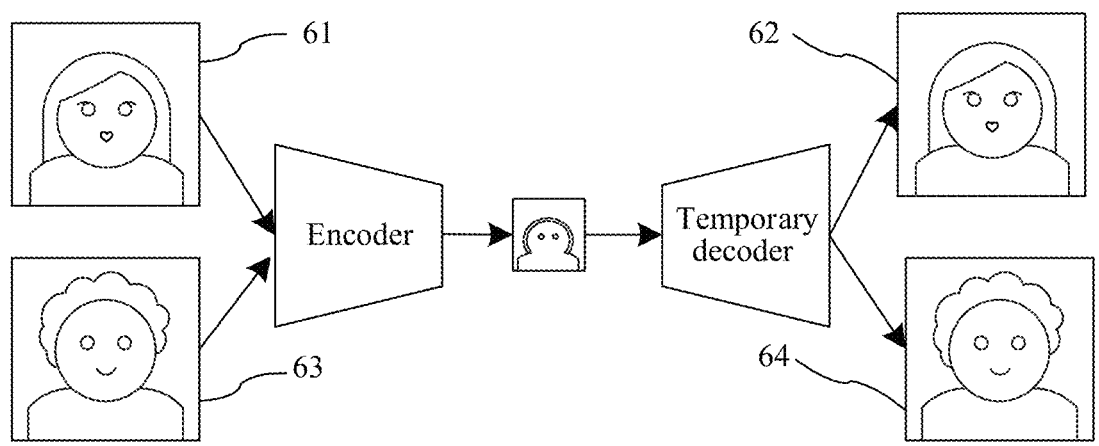
FIG. 12 is a schematic principle diagram of initializing an encoder according to an embodiment of this disclosure.

FIG. 12 is a schematic principle diagram of initializing an encoder according to an embodiment of this disclosure. After the initialization processing is performed on a face image 61 and a face image 63, distorted facial images of the face image 61 and the face image 63 are used for training a self-encoding network formed by the encoder and the temporary decoder. After training is completed, the temporary decoder is capable of reconstructing the distorted facial images in the face image 61 and the face image 63 based on a feature obtained by encoding by the encoder.

Figure 13:
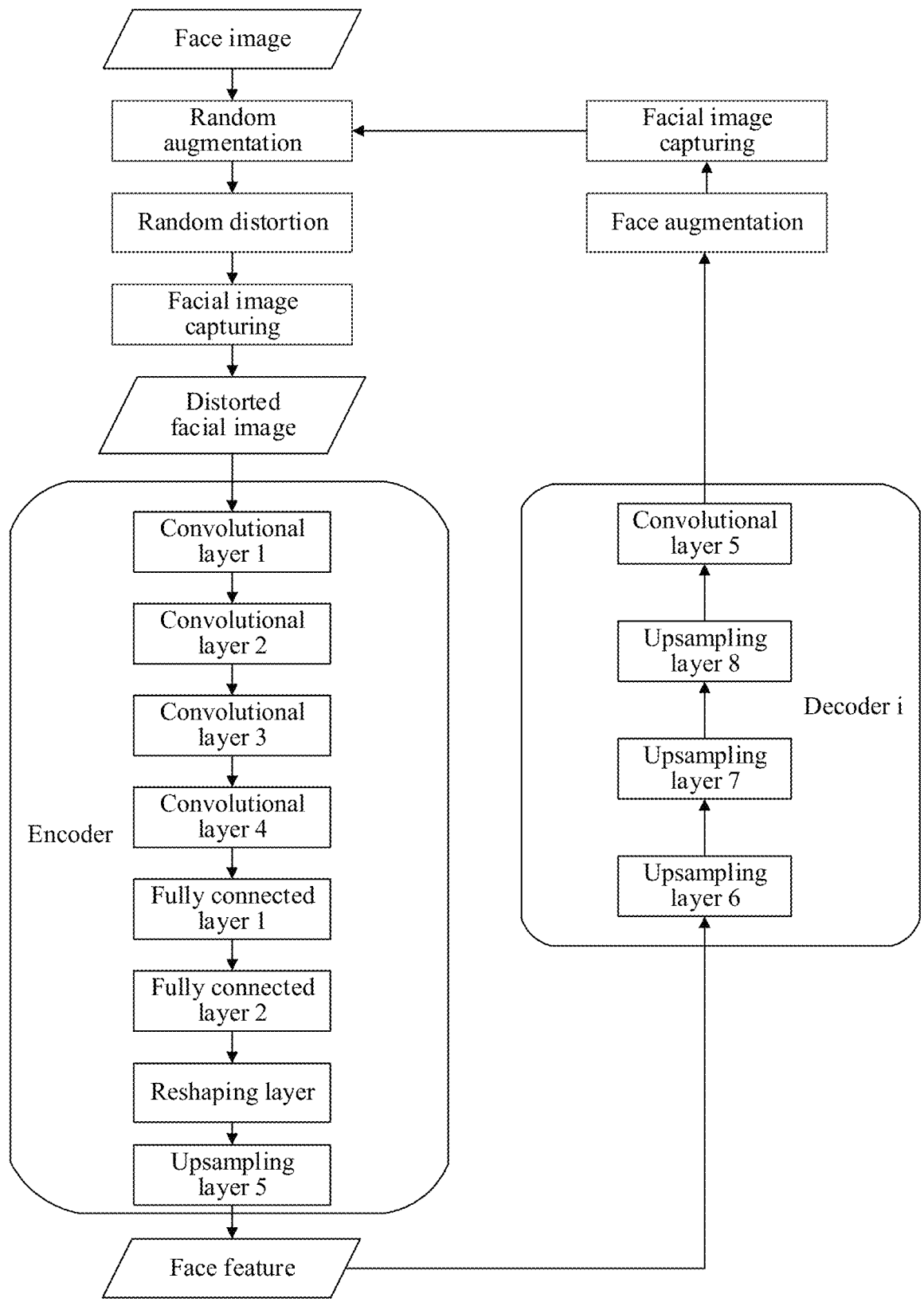
FIG. 13 is a schematic principle diagram of training a decoder of a single image processing model according to an embodiment of this disclosure.

FIG. 13 is a schematic principle diagram of training a decoder of a single image processing model according to an embodiment of this disclosure. A process of training the decoder of the single image processing model is described with reference to FIG. 12.

For example, a decoder for a user i is trained. Face data of the user i is first obtained. 150 or more face images of the user i may be selected by using an algorithm automatic classification method or a manually classification method. Random augmentation, random distortion, and facial image capturing are performed according to the initialization solution in the foregoing description to obtain a distorted facial image.

A self-encoding network formed by an encoder and a decoder i (an initial parameter of the decoder i is the same as the parameter of the temporary decoder) is trained by using the distorted facial image of the user i. During training, the parameter of the encoder does not need to be updated.

The encoder is recorded as Encoder(x), and x is an input distorted facial image. The decoder i is recorded as Decoder_i(f), and f is a feature obtained after x is encoded by the encoder. The parameter of the decoder Decoder_i is updated by using the following loss function loss_i: $\text{loss\_i} = \Sigma(\text{Decoder i}(\text{Encoder}(x)) - x)^2$.

When the loss_i is not remarkably reduced (that is, less than a threshold of the loss function), or when a quantity of times of iteration reaches a threshold of a quantity of times of iteration, training of the decoder i is completed.

Figure 14:
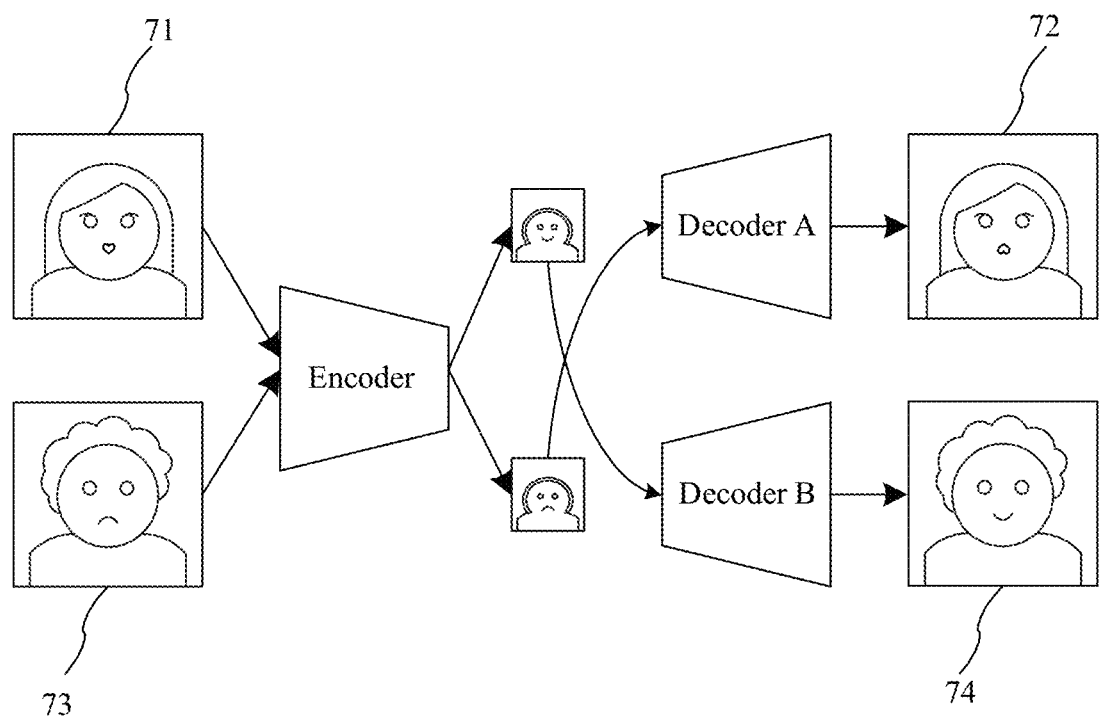
FIG. 14 is a schematic principle diagram of performing face changing by a single image processing model according to an embodiment of this disclosure.

FIG. 14 is a schematic principle diagram of performing face changing by a single image processing model according to an embodiment of this disclosure. An image processing model includes a decoder A trained for a user A and a decoder B trained for a user B.

When a face image 71 of the user A is inputted into an encoder, the encoder is capable of extracting a style feature of a face of the user A in the image 71. When the style feature is inputted into the decoder B, the decoder B has a capability of reconstructing a face image of the user B based on the style feature through training. Therefore, the decoder B is capable of reconstructing, based on the style feature, a face image 74 of the user B having the same style feature. Similarly, when an image 73 of the user B is inputted into the encoder, the encoder is capable of extracting a style feature of the user B in the image 73. When the style feature is inputted into the decoder A, the decoder A has a capability of reconstructing a face image of the user A based on the style feature through training. Therefore, the decoder A is capable of reconstructing, based on the style feature, a face image 72 of the user A having the same style feature.

Continuing to refer to the application scenario shown in FIG. 7, the image processing apparatus 10 may run in a terminal, and the training apparatus 30 may run in a server for performing a training task. A user intends to replace a face (that is, a to-be-replaced face 120) of a person in a video played in a video client of the terminal with a face (that is, a target face 110) of the user, and play a video with a face-changing effect (that is, a target face 130) in the video client.

Therefore, the user has uploaded a respective face image (that is, a target face) to the server and selected a role in a video with an intention to replace a face of the role (that is, a to-be-replaced face). The server trains an encoder and a decoder corresponding to a target object by using the training method for a single image processing model (that is, a face changing model) provided in the embodiment of this disclosure.

So far, training of the single image processing model is completed, and a process of training an image fusion processing model is started. An output result of the decoder of the single image processing model may be used as supervision data for training the image fusion processing model.

In some embodiments of this disclosure, the method further includes:

iteratively updating, according to the parameter of the encoder and the parameter of the decoder, the parameters of the encoders and the parameters of the decoders of all the single image processing models in a single image processing model set corresponding to the single image processing model until the loss functions of the parameters of the encoders and the loss function of the parameters of the decoders of all the single image processing models in the single image processing model set meet respective corresponding convergence conditions, a quantity of single image processing models in the single image processing model set being adapted to a use environment of the single image processing model. A fusion face changing model may be deployed in different use environments, for example, the fusion face changing model may be deployed in a server of a short video operator, or a terminal of a user (including a network environment and an offline environment). A training capability for the image fusion processing model varies with the different use environments. The parameters of the encoders and the parameters of the decoders of all the single image processing models in the single image processing model set corresponding to the single image processing model are iteratively updated according to the parameter of the encoder and the parameter of the decoder until the loss functions of the parameters of the encoders and the parameters of the decoders of all the single image processing models in the single image processing model set satisfies the respective corresponding convergence conditions. Under these measures, occupation of hardware resources may be reduced, and an increase in the costs of hardware devices is reduced. Thereby, larger range deployment of the image fusion processing model can be implemented, and user experience is improved.

Step 904. Update parameters of an encoder and a decoder of the image fusion processing model according to different to-be-replaced faces and different target faces that are in the original image set while the parameters of the encoder and the decoder of the single image processing model maintain unchanged.

Therefore, the decoder in the image fusion processing model is capable of performing decoding based on style features of the different to-be-replaced faces, and obtaining, through decoding, different target faces having the same style as the corresponding to-be-replaced faces.

In some embodiments of this disclosure, before the updating a parameter of a state encoder in the image fusion processing model according to different to-be-replaced faces in the original image set, the method further includes:

extracting a first quantity of face images from the original image set as a first training set according to a use environment of the image fusion processing model; extracting a second quantity of face images from the original image set as a second training set, the face image in the second training set being a front face image of a to-be-replaced face; and loading binary data of the face images that are in an undecompressed state and that respectively correspond to the first training set and the second training set and a corresponding quantity of single face changing models in response to the first training set and the second training set to complete training initialization of a fusion face changing model. Different use environments have different processing capabilities (training and use) for the image fusion processing model because use environments in which the image fusion processing model is deployed are different, that is, the image fusion processing model may be deployed in a server of a corresponding software operator or may be deployed in a terminal of a user. The first quantity of face images is extracted from the original image set as the first training set according to the use environment of the image fusion processing model, and the second quantity of face images is extracted from the original image set as the second training set. Thereby, larger range deployment of the image fusion processing model is implemented, and user experience are improved.

In some embodiments of this disclosure, the step of updating parameters of an encoder and a decoder of the image fusion processing model according to different to-be-replaced faces and different target faces that are in the original image set while the parameters of the encoder and the decoder of the single image processing model maintain unchanged may be implemented through the following manners:

using a decoding result of the decoder of the single image processing model as training supervision data in the image fusion processing model; updating a parameter of a state encoder in the image fusion processing model according to the different to-be-replaced faces in the original image set, so that the state encoder in the image fusion processing model is capable of performing encoding on the different to-be-replaced faces separately and obtaining, through encoding, state features corresponding to the different to-be-replaced faces; updating a parameter of a facial encoder in the image fusion processing model according to the different target faces, so that the facial encoder in the image fusion processing model is capable of performing encoding on the different target faces separately, and obtaining, through encoding, facial features corresponding to the different target faces; and updating a parameter of a fusion decoder in the image fusion processing model according to an encoding result of the state encoder and an encoding result of the facial encoder that are in the image fusion processing model, so that the fusion decoder in the image fusion processing model is capable of performing decoding based on style features of the different to-be-replaced faces, and obtaining, through decoding, different target faces having the same style as the corresponding to-be-replaced faces.

In some embodiments of this disclosure, the step of updating a parameter of a state encoder in the image fusion processing model according to the different to-be-replaced faces in the original image set may be implemented through the following manners:

substituting the state features of the different to-be-replaced faces in the original image set into a loss function corresponding to a self-encoding network formed by the encoder and the decoder of the image fusion processing model, and determining, while the loss function satisfies a convergence condition, the parameter corresponding to the state encoder in the image fusion processing model.

In some embodiments of this disclosure, the step of updating a parameter of a facial encoder in the image fusion processing model according to the different target faces may be implemented through the following manners:

substituting the facial features of the different target faces into a loss function corresponding to a self-encoding network formed by the encoder and the decoder of the image fusion processing model and determining, while the loss function satisfies a convergence condition, the parameter corresponding to the facial encoder in the image fusion processing model.

In some embodiments of this disclosure, the step of updating a parameter of a fusion decoder in the image fusion processing model according to an encoding result of the state encoder and an encoding result of the facial encoder that are in the image fusion processing model may be implemented through the following manners:

substituting the state features of the different to-be-replaced faces and the facial features of the different target faces that are in the original image set into a loss function corresponding to a self-encoding network formed by the state encoder, the facial encoder, and the fusion decoder of the image fusion processing model and determining, while the loss function satisfies a convergence condition, the parameter corresponding to the fusion decoder.

Figure 15:
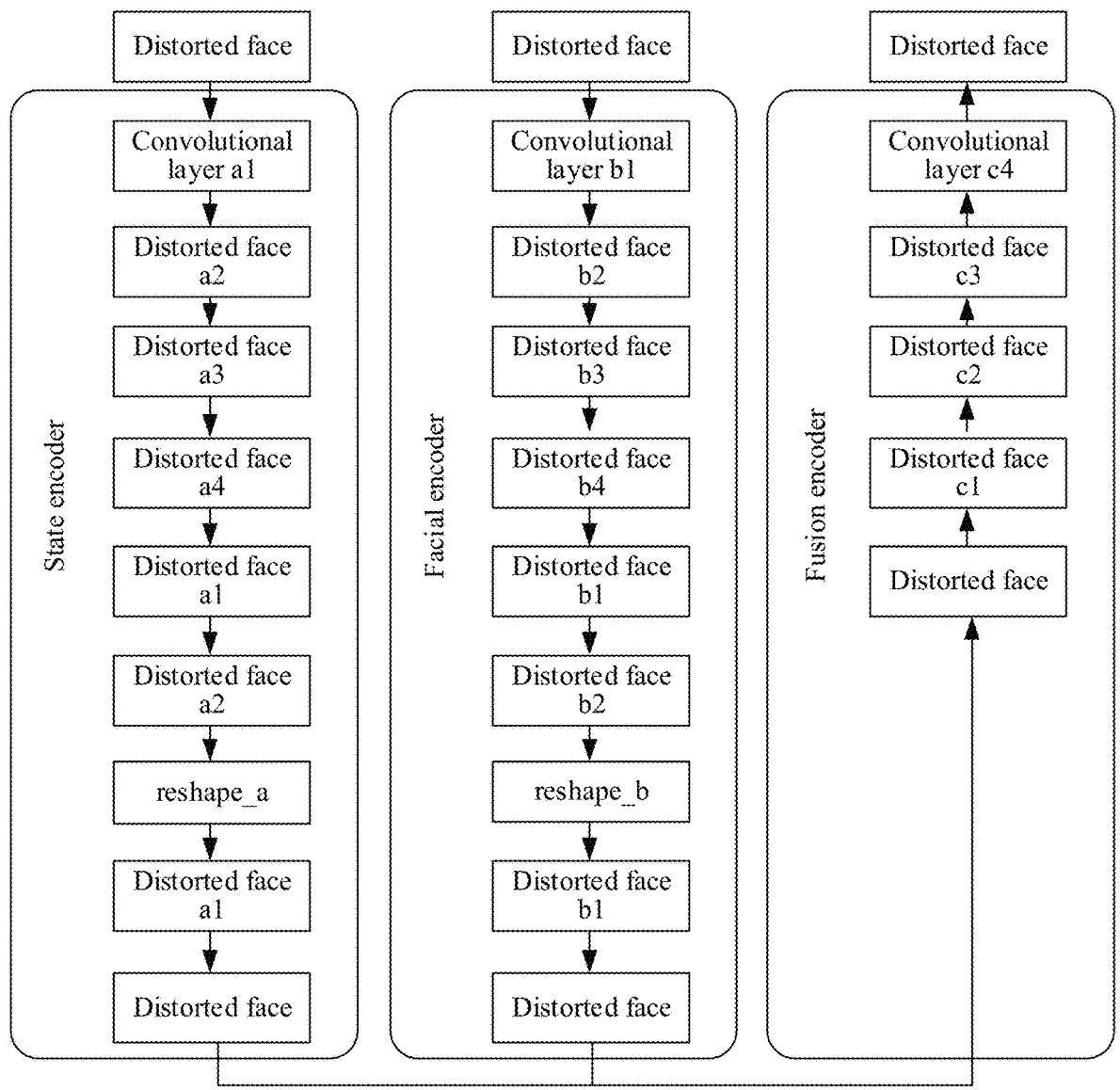
FIG. 15 is a schematic structural diagram of an image fusion processing model according to an embodiment of this disclosure.

The following describes a specific process of training and applying the image fusion processing model for exchanging faces (also referred to as a fusion face changing model). FIG. 15 is a schematic structural diagram of an image fusion processing model according to an embodiment of this disclosure. A structure of the image fusion processing model shown in FIG. 15 includes a state encoder, a facial encoder, and a fusion decoder.

The state encoder is configured to extract a state feature of a to-be-replaced face, for example, an expression, a posture, and an illumination condition. Only a facial feature of a target feature is reserved in an encoding result of the facial encoder, and the state feature is removed. Finally, the fusion decoder obtains different target faces having the same style as the corresponding to-be-replaced faces through decoding according to the state feature and the facial feature. A new target face has a state of the to-be-replaced face and a facial feature of the target face, and thereby, it implements a face changing function for different target faces in batches.

Different target faces are inputted, and different target faces having the same style as the corresponding to-be-replaced faces are obtained through decoding. Parameters of the state encoder, the facial encoder, and the fusion decoder of the image fusion processing model shown in FIG. 15 are shown in Table 3.

TABLE 3

| Layer type | Quantity of channels | Size of convolution kernels | Step | Filler | Activation function | |
|---|---|---|---|---|---|---|
| To-be-replaced face (64 * 64 * 3) | 3 | — | — | — | — | |
| Convolutional layer a1 | 128 | (5, 5) | (2, 2) | same | pReLU | State |
| Convolutional layer a2 | 256 | (5, 5) | (2, 2) | same | pReLU | encoder |
| Convolutional layer a3 | 512 | (5, 5) | (2, 2) | same | pReLU | |
| Convolutional layer a4 | 1024 | (5, 5) | (2, 2) | same | pReLU | |
| Fully connected layer a1 | 1024 | (5, 5) | — | — | pReLU | |
| Fully connected layer a2 | 16384 | (5, 5) | — | — | pReLU | |
| Reshape layer a | — | (4, 4, 1024) | — | — | — | |
| Upsampling convolutional layer a1 | 512 | (3, 3) | (2, 2) | same | pReLU | |
| Target face (64 * 64 * 3) | 3 | — | — | — | — | |
| Convolutional layer a1 | 128 | (5, 5) | (2, 2) | same | pReLU | Facial |
| Convolutional layer a2 | 256 | (5, 5) | (2, 2) | same | pReLU | encoder |
| Convolutional layer a3 | 512 | (5, 5) | (2, 2) | same | pReLU | |
| Convolutional layer a4 | 1024 | (5, 5) | (2, 2) | same | pReLU | |
| Fully connected layer a1 | 1024 | (5, 5) | — | — | pReLU | |
| Fully connected layer a2 | 16384 | (5, 5) | — | — | pReLU | |

TABLE 3-continued

| Layer type | Quantity of channels | Size of convolution kernels | Step | Filler | Activation function | |
|---|---|---|---|---|---|---|
| Reshape layer a | — | (4, 4, 1024) | — | — | — | |
| Splicing layer | Splicing in a dimension of a channel | | | | Fusion | |
| Upsampling convolutional layer a2 | 512 | (3, 3) | (2, 2) | same | pReLU | decoder i |
| Upsampling convolutional layer a3 | 256 | (3, 3) | (2, 2) | same | pReLU | |
| Upsampling convolutional layer a4 | 128 | (3, 3) | (2, 2) | same | pReLU | |
| Upsampling convolutional layer a5 | 64 | (3, 3) | (2, 2) | same | pReLU | |
| Convolutional layer 4 | 3 | (3, 3) | (1, 1) | same | pReLU | |
| Output (128 * 128 * 3) | 3 | — | — | — | — | |

So far, training of the image fusion processing model is completed, and the trained image fusion processing model may be deployed in a corresponding server, or certainly may be deployed in a user terminal (the image fusion processing model processes different images in an offline state), and a deployment location of the image fusion processing model is not limited in this application.

Figure 16:
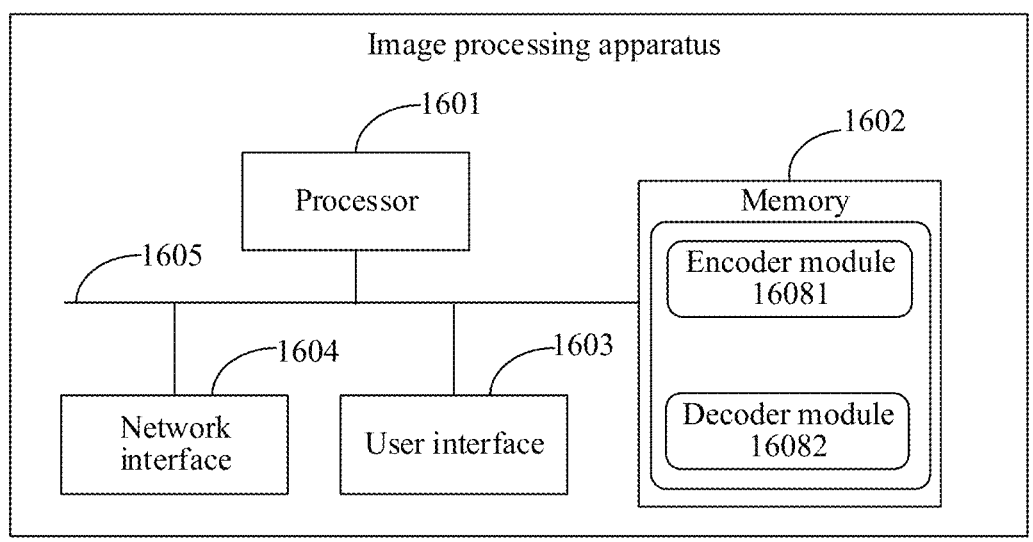
FIG. 16 is a schematic structural diagram of an image processing apparatus according to an embodiment of this disclosure.

When the training of the image fusion processing model is completed through the foregoing embodiments, the image fusion processing model needs to be deployed in a corresponding terminal or server. A hardware structure of the image processing apparatus for implementing this embodiment of this disclosure is continued to be described according to a target accompanying drawing, and the image processing apparatus for implementing this embodiment of this disclosure may be a server or various types of terminals. FIG. 16 is a schematic structural diagram of an image processing apparatus according to an embodiment of this disclosure. Description is provided with reference to a structure shown in FIG. 16.

The following describes a structure of the image processing apparatus for an image fusion processing model according to the embodiment of this disclosure in detail. The image processing apparatus for an image fusion processing model may be implemented in various forms, for example, a terminal with an image fusion processing model execution function, or a server provided with an image processing function of an image fusion processing model, for example, the corresponding server in FIG. 7. FIG. 16 is a schematic structural diagram of compositions of an image processing apparatus for an image fusion processing model according to an embodiment of this disclosure. It may be understood that FIG. 16 shows only an exemplary structure rather than all structures of the image processing apparatus for an image fusion processing model. A part of the structure or the entire structure shown in FIG. 16 may be implemented based on demands.

The image processing apparatus for an image fusion processing model provided in this embodiment of this disclosure includes: at least one processor 1601, a memory 1602, a user interface 1603, and at least one network interface 1604. Various assemblies in the image processing apparatus for an image fusion processing model are coupled together via a bus system 805. It may be understood that the bus system 1605 is configured to implement connection and communication between these assemblies. In addition to a data bus, the bus system 805 further includes a power bus, a control bus, and a state signal bus. However, for ease of clear description, all types of buses in FIG. 8 are marked as the bus system 1605. Functions of software modules in the image processing apparatus includes an encoder module 16081 and a decoder module 16082.

The encoder module 16081 is configured to encode an original image set by using a state encoder of an image fusion processing model to obtain style features of different to-be-replaced faces in the original image set. The encoder module 16081 is further configured to encode different target faces by using a facial encoder of the image fusion processing model to obtain facial features corresponding to the different target faces. The decoder module 16082 is configured to input the style features and the facial features into a fusion decoder of the image fusion processing model, and the decoder module 16082 is further configured to perform decoding in the fusion decoder based on the style features of the different to-be-replaced faces and the facial features of the different target faces, to obtain different target faces having the same style as the different to-be-replaced faces. The parameters of the encoder and the decoder of the image fusion processing model are obtained by performing updating according to a single target image while parameters of an encoder and a decoder of a single image processing model maintain unchanged.

Figure 17:
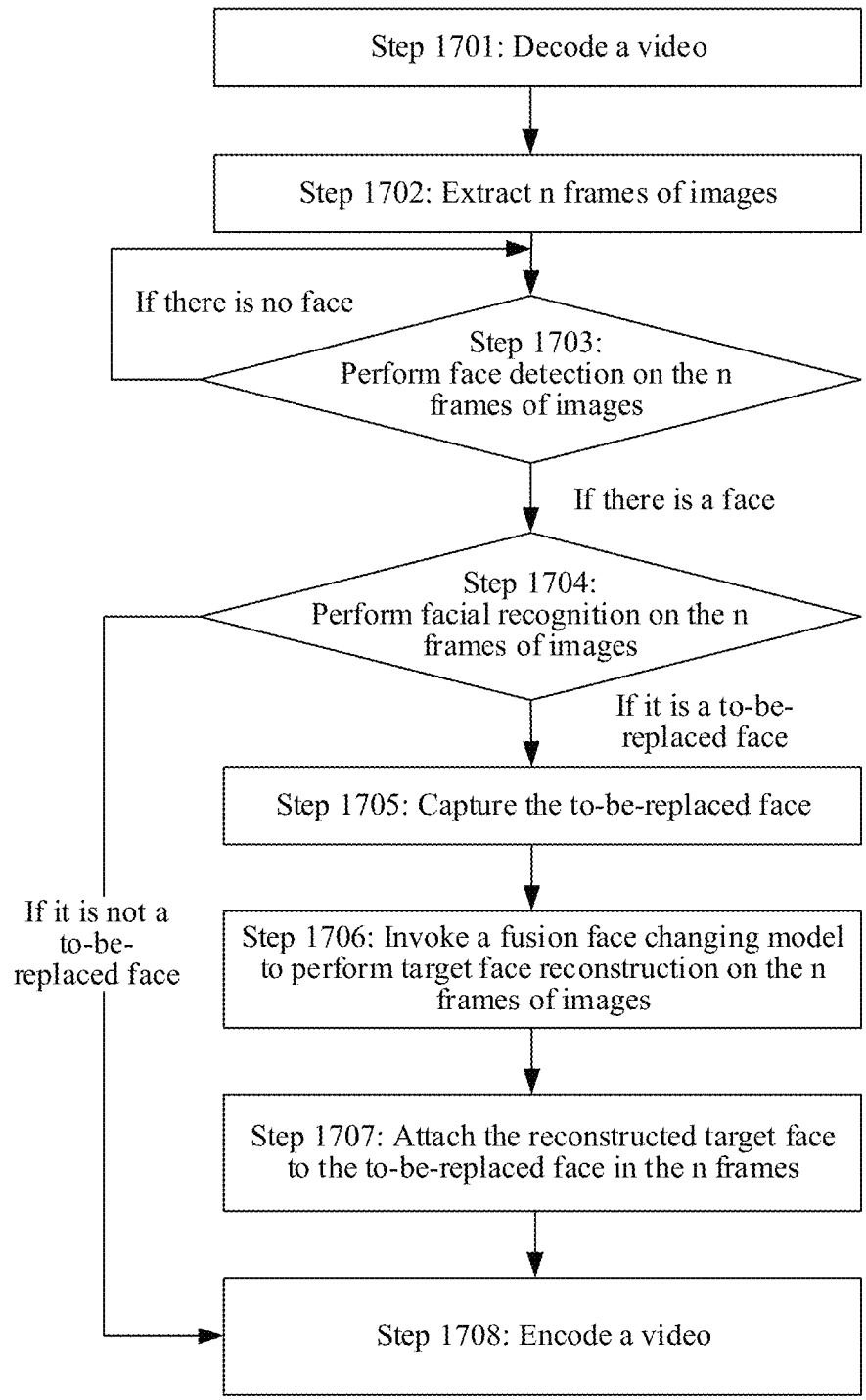
FIG. 17 is an optional schematic flowchart of a training method for an image fusion processing model according to an embodiment of this disclosure.

The training method for an image fusion processing model provided in the embodiment of this disclosure is described with reference to an electronic device shown in FIG. 16. FIG. 17 is a flowchart of forming a video with a face changing effect according to an embodiment of this disclosure. It may be understood that steps shown in FIG. 17 may be performed by electronic devices running the image processing apparatus for an image fusion processing model, for example, a terminal, a server, or a server cluster having an image processing function of an image fusion processing model. The following describes steps shown in FIG. 17.

FIG. 17 is a flowchart of forming a video with a face changing effect according to an embodiment of this disclosure. A process of making a video with a face changing effect by a server is described with reference to the shown steps.

Step 1701. Decode a video.

Through step 1701, the video is decoded to obtain a series of frame images. An example in which n (n is an integer greater than or equal to 1) frames of images are selected is used below for description.

Step 1702. Extract n frames of images.

The extracted n frames of images are to-be-replaced faces.

Step 1703. Perform face detection on the n frames of images. If there is a face, perform step 1704. If there is no face, return to extract n+1 frames of images to continue to perform face detection.

Step 1704. Perform facial recognition on the n frames of images to determine whether a to-be-replaced face is included. If it is included, perform step 1705. If not, perform step 1708.

Step 1705. Capture the to-be-replaced face.

Step 1706. Invoke a fusion face changing model to perform target face reconstruction on the n frames of images.

A state encoder in the fusion face changing model encodes a to-be-replaced face to obtain a state feature of the to-be-replaced face. A facial encoder encodes a target face to obtain a facial feature of the target face, and a fusion decoder performs decoding by using the state feature of the to-be-replaced face and the facial feature of the target face to obtain a target face with a style feature.

Step 1707. Attach the reconstructed target face to the to-be-replaced face in the n frames.

Step 1708. Encode a video.

After processing of the frame image in the video is completed, each frame of video is encoded according to an original format of the video, or certainly may be encoded as another format.

It may be understood that the video production processing may also be migrated to a terminal, and adaptive decoding/encoding parameters may be adopted according to a hardware configuration of the terminal.

Figure 18A:
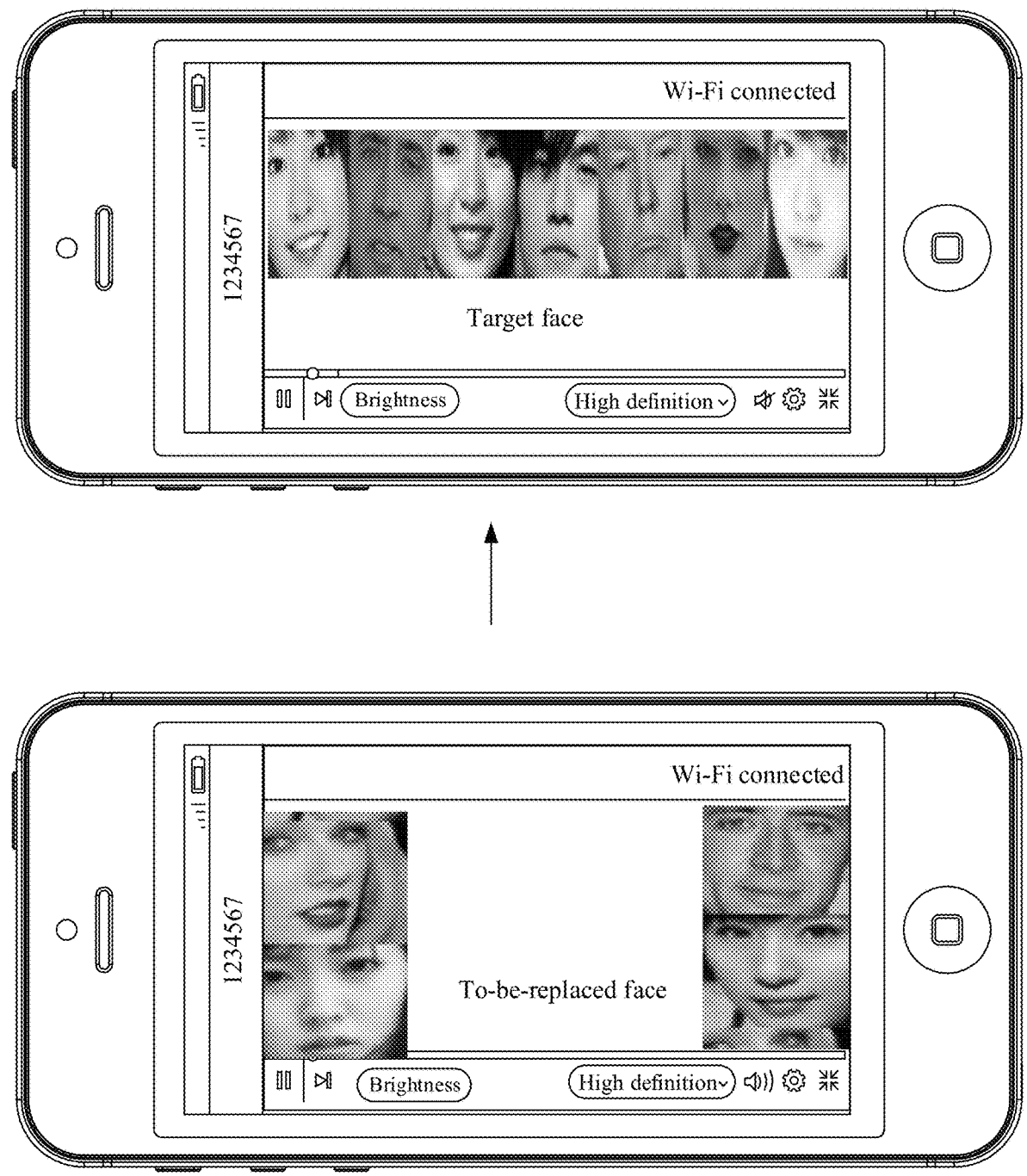
FIG. 18A is a schematic diagram of different to-be-replaced faces and different target faces that are in an original image set and that are inputted by a user through a terminal.
Figure 18B:
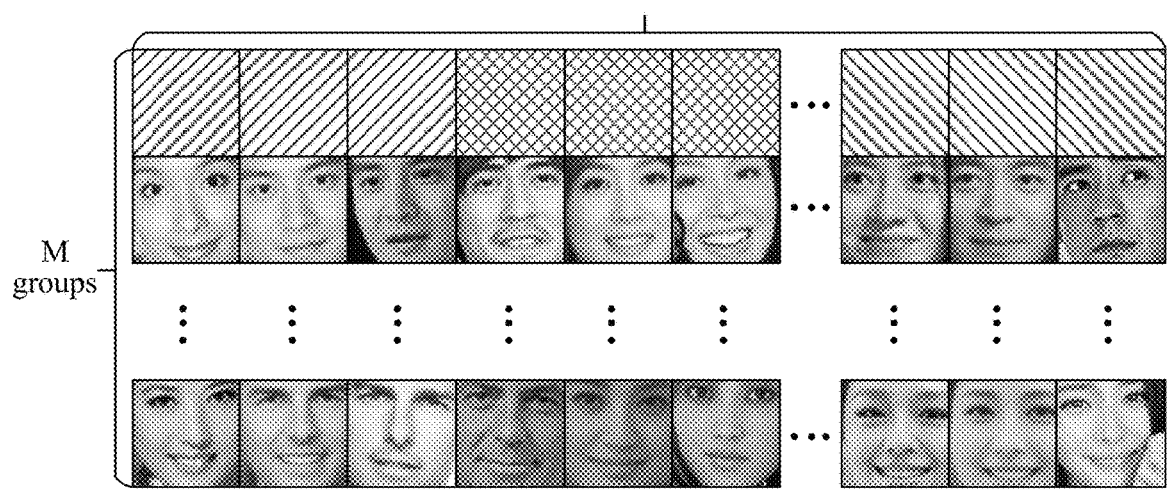
FIG. 18B is a schematic diagram of different to-be-replaced faces and different target faces that are in an original image set and that are inputted by a user through a terminal.

The following describes the image fusion processing model provided in the embodiment of this disclosure, including two parts of training the single image processing model and training the image fusion processing model. FIG. 18A is a schematic diagram of different to-be-replaced faces and different target faces that are in an original image set and that are inputted by a user through a terminal. A quantity of different to-be-replaced faces and a quantity of different target faces that are in the original image set may be adjusted through a user terminal. FIG. 18B is a schematic diagram of different to-be-replaced faces and different target faces that are in an original image set and that are inputted by a user through a terminal. A quantity of different to-be-replaced faces and a quantity of different target faces that are in the original image set may be adjusted through a user terminal to implement processing of M*N groups of to-be-replaced faces and different target faces. Values of M and N may be adjusted according to different requirements.

The following describes a process of processing the different to-be-replaced faces and the different target faces shown in FIG. 18A and FIG. 18B.

Figure 19:
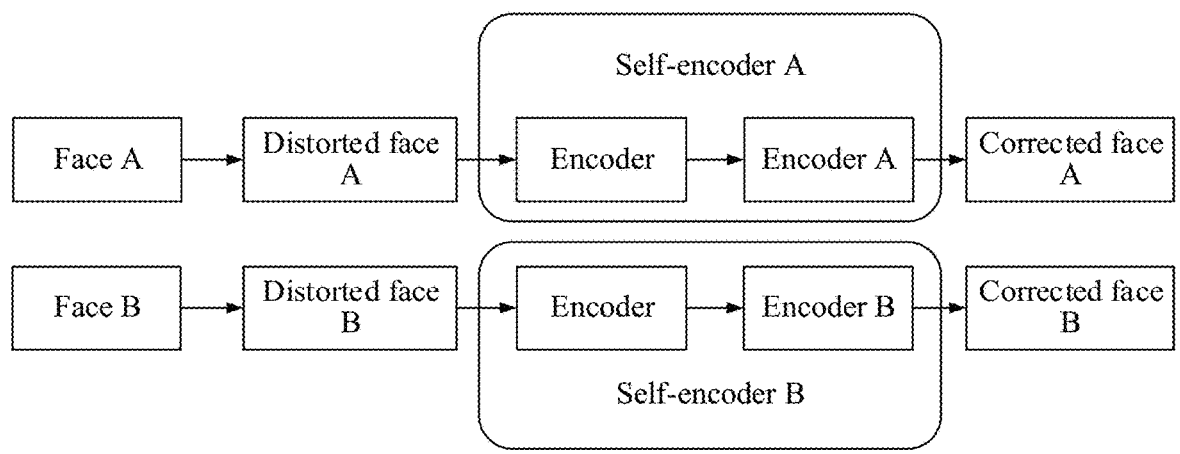
FIG. 19 is a schematic diagram of a process of training a single image processing model and a process of training an image fusion processing model.

First, a working principle of a face changing model in a related art is described. FIG. 19 is a schematic diagram of a process of training a single image processing model and a process of training an image fusion processing model. A training method for a single image processing model includes that each self-encoder separately tries to restore a distortion in an input face and restore distorted faces to normal faces corresponding to people. Two self-encoders share one encoder.

Thereby, after being encoded by the encoder, two faces can be mapped to the same function space, and a decoder B is capable of decoding a feature (for example, illumination, an expression, and a line-of-sight direction) of a face A encoded by an encoder in the self-encoder A to implement a corresponding face changing processing effect.

When a face changing model is used, if a face of B needs to be changed to a face of A, the face of B is inputted into the self-encoder A, and a face that is changed is obtained. Similarly, if the face of A is changed to the face of B, the face of A is inputted into the self-encoder B.

Figure 20:
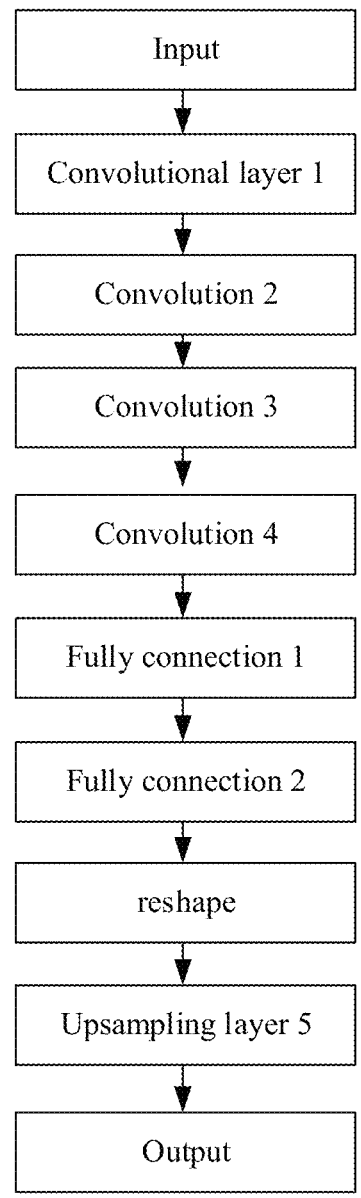
FIG. 20 is an exemplary structural diagram of an encoder according to an embodiment of this disclosure.
Figure 21:
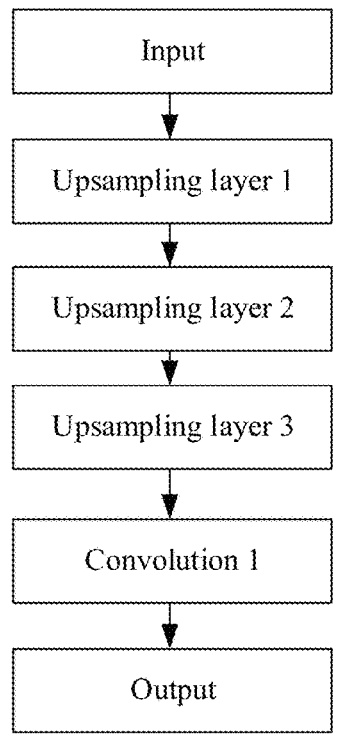
FIG. 21 is an exemplary structural diagram of a decoder according to an embodiment of this disclosure.

In some embodiments of this disclosure, an encoder in a structure of a mode is shown in FIG. 20, and a structure of a decoder is shown in FIG. 21. FIG. 20 is an exemplary structural diagram of an encoder according to an embodiment of this disclosure. As shown in FIG. 20, the encoder includes four convolutional layers, two fully-connected layers, one reshaping layer, and one upsampling layer. Exemplary parameters of the layers are shown in Table 4. A layer type and a quantity of channels that are in the encoder are changed variously, and this is not limited to what are shown in FIG. 20 and Table 4.

TABLE 4

| Layer type | Quantity of channels | Convolution kernel | Step | Filler | Activation function |
| --- | --- | --- | --- | --- | --- |
| Input layer | 3 | — | — | — | — |
| Convolutional layer 1 | 128 | (5, 5) | (2, 2) | Same pixel | Parametric rectified linear unit (pReLU) |
| Convolutional layer 2 | 256 | (5, 5) | (2, 2) | Same pixel | pReLU |
| Convolutional layer 3 | 512 | (5, 5) | (2, 2) | Same pixel | pReLU |
| Convolutional layer 4 | 1024 | (5, 5) | (2, 2) | Same pixel | pReLU |
| Fully connected layer 1 | 1024 | (5, 5) | — | — | pReLU |
| Fully connected layer 2 | 16384 | (5, 5) | — | — | pReLU |
| Reshaping layer | — | (4, 4, 1024) | — | — | — |
| Upsampling layer 1 | 512 | (3, 3) | (2, 2) | Same pixel | pReLU |

FIG. 21 is an exemplary structural diagram of a decoder according to an embodiment of this disclosure. As shown in FIG. 21, the decoder includes three upsampling layers and one convolutional layer, and exemplary parameters of the layers of the decoder are shown in Table 5. A layer type and a quantity of channels that are in the decoder are changed variously, and this is not limited to what are shown in FIG. 21 and Table 5.

TABLE 5

| Layer type | Quantity of channels | Convolution kernel | Step | Filler | Activation function |
| --- | --- | --- | --- | --- | --- |
| Input layer | 512 | — | — | — | — |
| Upsampling layer 1 | 256 | — | (2, 2) | Same pixel | pReLU |
| Upsampling layer 2 | 128 | (3, 3) | (2, 2) | Same pixel | pReLU |
| Upsampling layer 3 | 64 | (3, 3) | (2, 2) | Same pixel | pReLU |
| Convolutional layer 4 | 3 | (3, 3) | (2, 2) | Same pixel | — |

The training method for a face changing model is as follows.

Step 1. Denoting an encoder as "Encoder," a decoder A as "decoder_A," a decoder B as "decoder_B," a function of a distorted face as "warp," and optimize values of the encoder and the decoder A once by using data $x_1$ of a face A and the following loss function:

$$\text{loss\_}A = \Sigma(\text{decoder\_}A(\text{encoder}(\text{warp}(x_1))) - x_1)^2$$

Step 2. Optimize values of the encoder and the decoder B once by using data x2 of a face B and the following loss function:

$$loss\_B = \Sigma(decoder\_B(encoder(warp(x_2))) - x_2)^2$$

Step 3. Repeat step 1 and step 2 until a reduction value of a sum of the loss_A and the loss_B is less than a set threshold ε.

The defects generated in a co-working process of the conventional face changing model include:

(1) A conventional face changing model only supports the processing of single-person face-changing. Thus, if a new face needs to be changed, a new model needs to be trained, which is time-consuming and troublesome. Each model needs to occupy respective storage space, and the process is complex. The time consumption of the entire face changing processing flow is increased, and user experience is affected.

(2) Training a single face changing model requires 100 or more pictures (face images) as training samples, and users of the face changing model often do not provide their own face images as training samples for privacy reasons, affecting dispersion of the training sample image.

Figure 22:
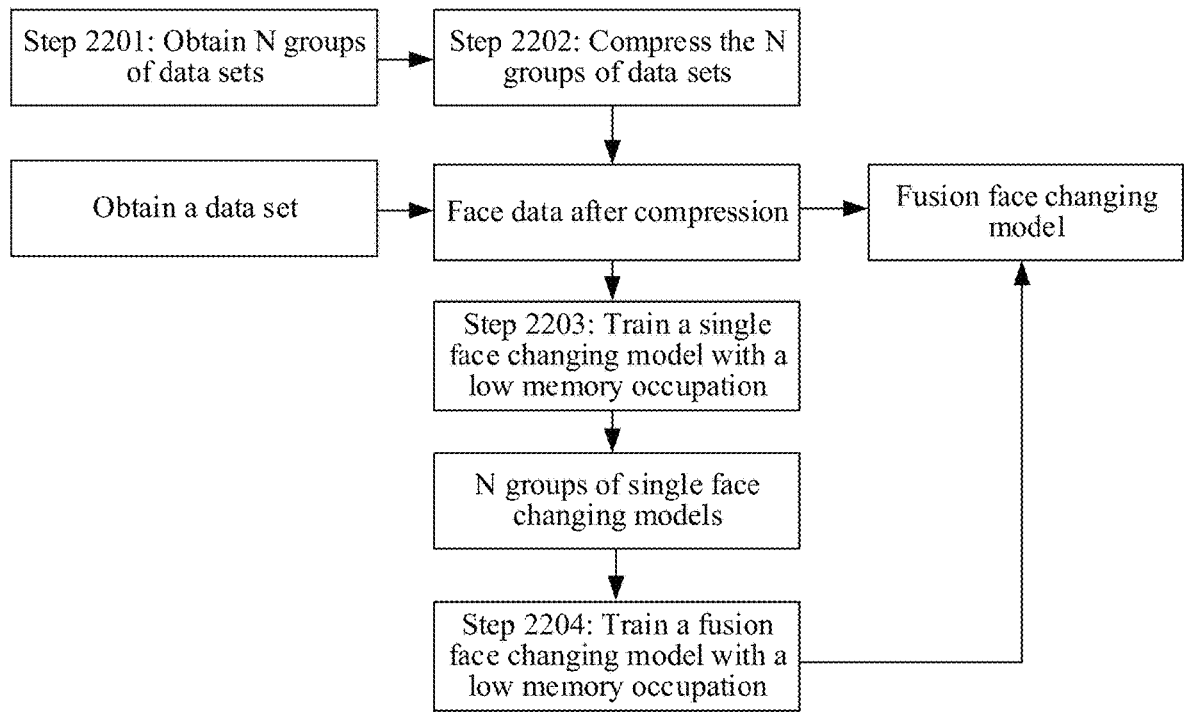
FIG. 22 is an optional processing flowchart of an image fusion processing method according to an embodiment of this disclosure.

To overcome the above defects, the embodiment of this disclosure provides an image fusion processing method. FIG. 22 is an optional process flow of the image fusion processing method according to the embodiment of this disclosure. It may be understood that steps shown in FIG. 22 may be performed by electronic devices running the image processing apparatus for an image fusion processing model, for example, a terminal, a server, or a server cluster having an image processing function of an image fusion processing model. The following describes steps shown in FIG. 22, and includes the following steps.

Step 2201. Obtain N groups of data sets.

N is a positive integer greater than or equal to 1, and a value of N may be adjusted according to different requirements to adapt to the electronic devices running the image processing method for an image fusion processing model.

Step 2202. Compress the N groups of data sets.

Step 2203. Train a single face changing model with a low memory occupation.

Step 2204. Train a fusion face changing model with a low memory occupation.

Figure 23:
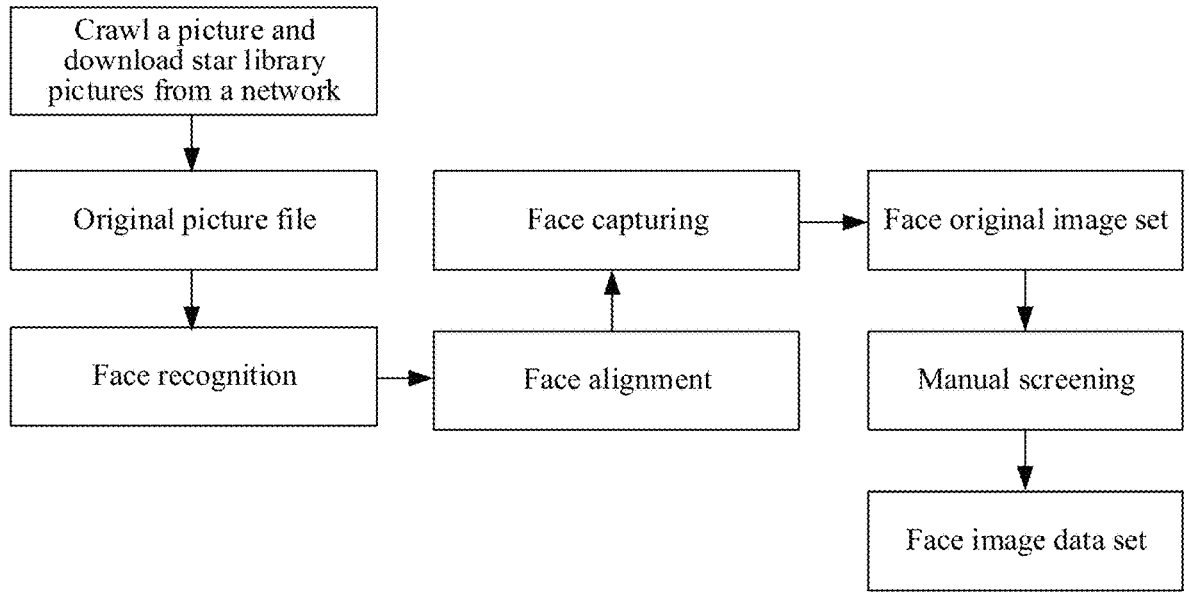
FIG. 23 is a schematic diagram of obtaining a data set according to this disclosure.

The following describes steps shown in FIG. 22 separately. FIG. 23 is a schematic diagram of obtaining a data set according to this application, and may include the following steps.

(1) Collect a picture file of a person including a single face changing model to be trained by means of network crawling, downloading star library pictures, and the like, at least 100 per person.

(2) Invoke a face detection algorithm (an MTCNN face detection algorithm adopted herein, another method is feasible) and find an approximate position of a face.

(3) Invoke a face alignment algorithm, and correct a box selected position of the face by taking an eye as a center to make the box selected face position more accurate, and ensure that the eyes on the selected image are at a fixed position.

(4) Capture a face picture according to an automatically selected result, scale to a fixed size (preferably 256*256), and store the face picture as a face original image set.

(5) Manually screen the set obtained in step (4), and screen out the incorrectly recognized face data.

(6) Separately perform steps (1) to (5) for each person to generate a face image data set corresponding to each target person.

Figure 24:
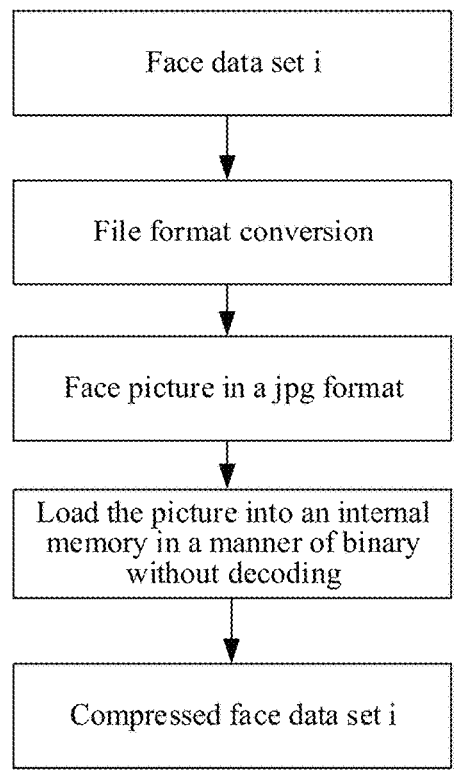
FIG. 24 is a schematic diagram of a process of compressing a data set according to this disclosure.

FIG. 24 is a schematic diagram of a process of compressing a data set according to this application, and may include the following steps.

(1) Save all face image data sets i by using a lossy jpg format.

(2) Load all jpg files in the data set directly into an internal memory, and obtain an RGB matrix without decoding the image.

(3) Undecompressed face picture data of $i^{th}$ person constructs a compressed face data set i in the internal memory.

Therefore, in a subsequent training process, a random face picture is decoded in real time to ensure a low memory occupation because not all the face pictures need to be decoded. Compression of the data set is implemented skillfully by using a compression rate of a jpg format, and such a compression manner can ensure that data does not need to be loaded from a hard disk each time data augmentation is performed. For face data to be used, it is very fast to decode the RGB matrix in the internal memory, and the time consumption for decompression caused by the compression method is acceptable by the user.

Figure 25:
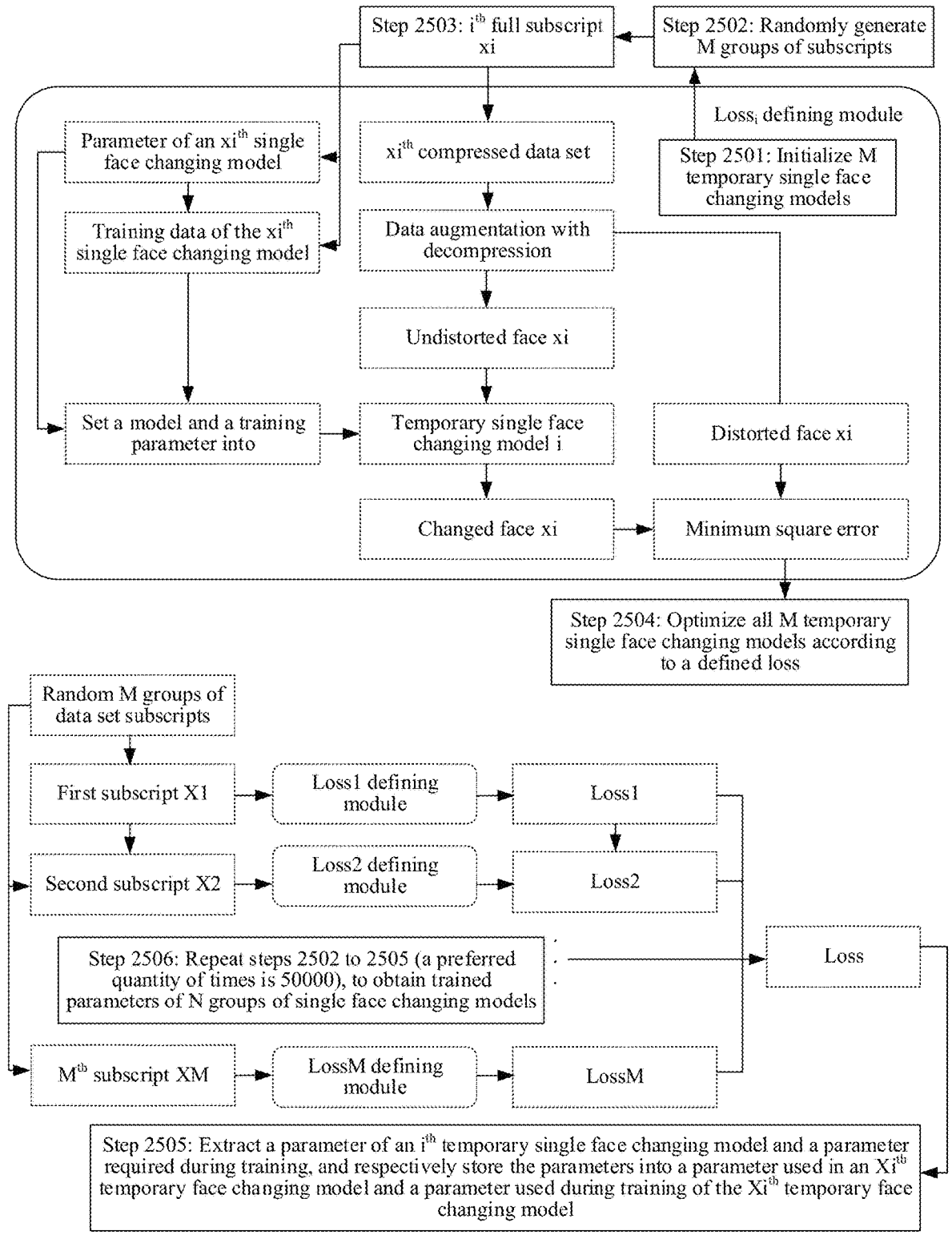
FIG. 25 is an optional schematic training flowchart of an image fusion processing method according to an embodiment of this disclosure.

FIG. 25 is an optional schematic training flowchart of an image fusion processing method according to an embodiment of this disclosure. It may be understood that steps shown in FIG. 25 may be performed by electronic devices running the image processing apparatus for an image fusion processing model, for example, a terminal, a server, or a server cluster having an image processing function of an image fusion processing model. The following describes steps shown in FIG. 25, and includes the following steps.

Step 2501. Initialize M temporary single face changing models.

M is a positive integer greater than or equal to 1, a value of M may be adjusted according to different requirements to adapt to the electronic devices running the image processing method for an image fusion processing model.

Step 2502. Randomly generate M groups of subscripts.

Step 2503. Perform the following operations for each subscript separately: recording an $i^{th}$ subscript as Xi, extracting a network parameter of an $Xi^{th}$ single face changing model and a parameter required during training, configuring the parameters into an $i^{th}$ temporary face changing model.

Step 2504. Optimize all M temporary single face changing models according to a defined loss.

The following operations are performed for each temporary single face changing model:

Step 2505. Extract a parameter of an $i^{th}$ temporary single face changing model and a parameter required during training, and store the parameters into a parameter used in an $Xi^{th}$ temporary face changing model and a parameter used during training of the $Xi^{th}$ temporary face changing model.

Step 2506. Repeat steps 2502 to 2505 (a preferred quantity of times is 50000), to obtain trained parameters of N groups of single face changing models.

The maximum quantity of the single face changing models that can be simultaneously processed by a hardware device is M, and the quantity of single face changing models that needs to be simultaneously trained is N.

The following describes the steps shown in FIG. 25 in sequence.

Figure 26:
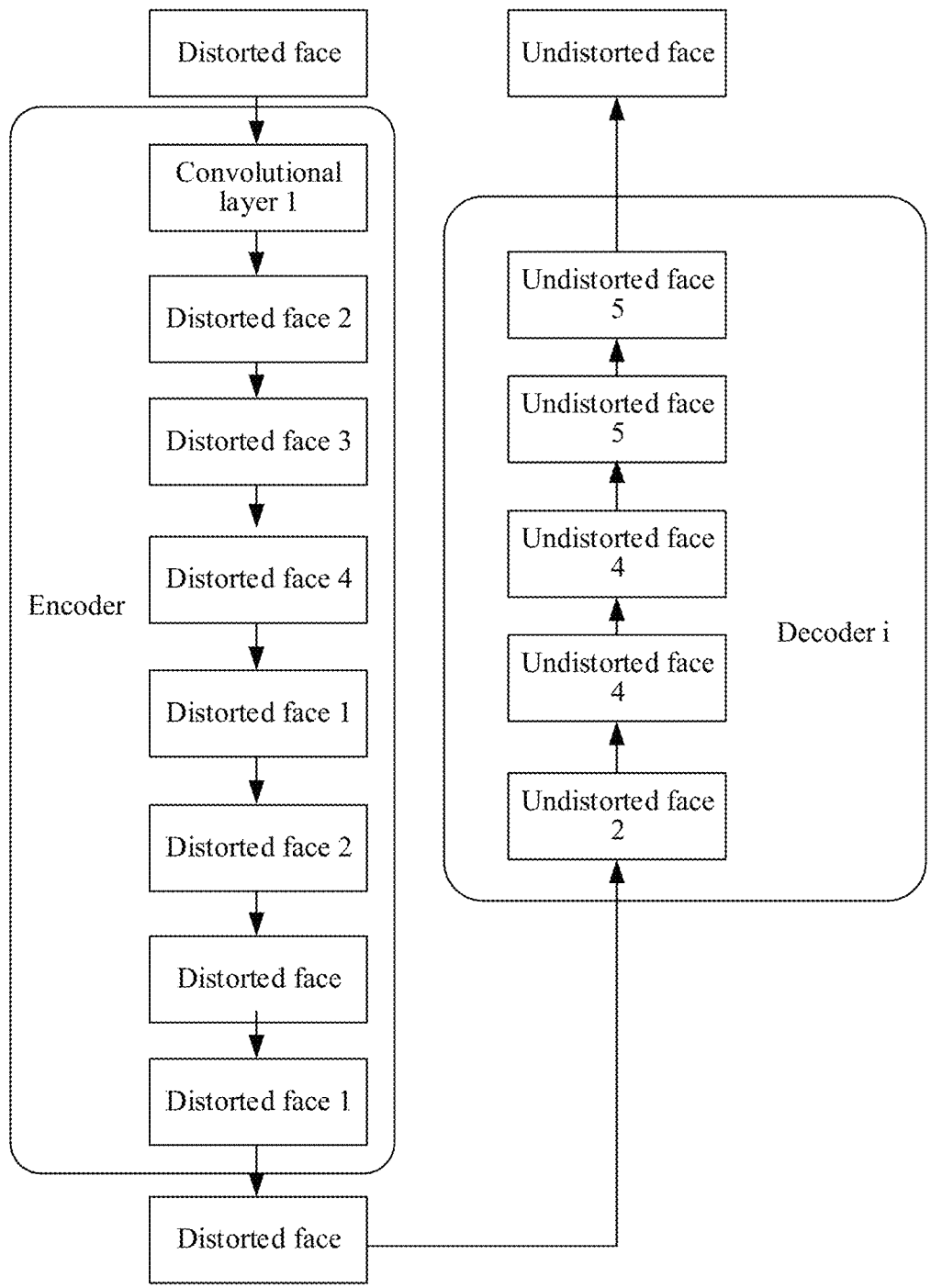
FIG. 26 is a schematic structural diagram of a network of a single face changing model according to an embodiment of this disclosure.

FIG. 26 is a schematic structural diagram of a network of a single face changing model according to an embodiment of this disclosure. All single face changing model share the same encoder. FIG. 26 is a schematic structural diagram of a network of a face changing model of an $i^{th}$ person. The face changing model for each person is implemented by connecting in series a decoder after an encoder, which is similar to that described above. All the face changing models share one encoder, and a face changing model of each person has a respective independent encoder i. A shared encoder is recorded as "encoder," and an encoder of an $i^{th}$ person is recoded as "encoder i." A network structure of the face changing model of the $i^{th}$ person is shown in FIG. 26, and parameters of layers of the network are shown in Table 6:

TABLE 6

| Layer type | Quantity of channels | Size of convolution kernels | Step | Filler | Activation function | |
|---|---|---|---|---|---|---|
| Input (64 * 64 * 3) | 3 | — | — | — | — | |
| Convolutional layer 1 | 128 | (5, 5) | (2, 2) | same | pReLU | Encoder |
| Convolutional layer 2 | 256 | (5, 5) | (2, 2) | same | pReLU | |
| Convolutional layer 3 | 512 | (5, 5) | (2, 2) | same | pReLU | |
| Convolutional layer 4 | 1024 | (5, 5) | (2, 2) | same | pReLU | |
| Fully connected layer 1 | 1024 | (5, 5) | — | — | pReLU | |
| Fully connected layer 2 | 16384 | (5, 5) | — | — | pReLU | |
| Reshape layer | — | (4, 4, 1024) | — | — | — | |
| Upsampling convolutional layer 1 | 512 | (3, 3) | (2, 2) | same | pReLU | |
| Upsampling convolutional layer 2 | 256 | (3, 3) | (2, 2) | same | pReLU | Decoder i |
| Upsampling convolutional layer 3 | 256 | (3, 3) | (2, 2) | same | pReLU | |
| Upsampling convolutional layer 4 | 128 | (3, 3) | (2, 2) | same | pReLU | |
| Upsampling convolutional layer 5 | 64 | (3, 3) | (2, 2) | same | pReLU | |
| Convolutional layer 4 | 3 | (3, 3) | (1, 1) | same | pReLU | |
| Output (128 * 128 * 3) | 3 | — | — | — | — | |

Figure 27:
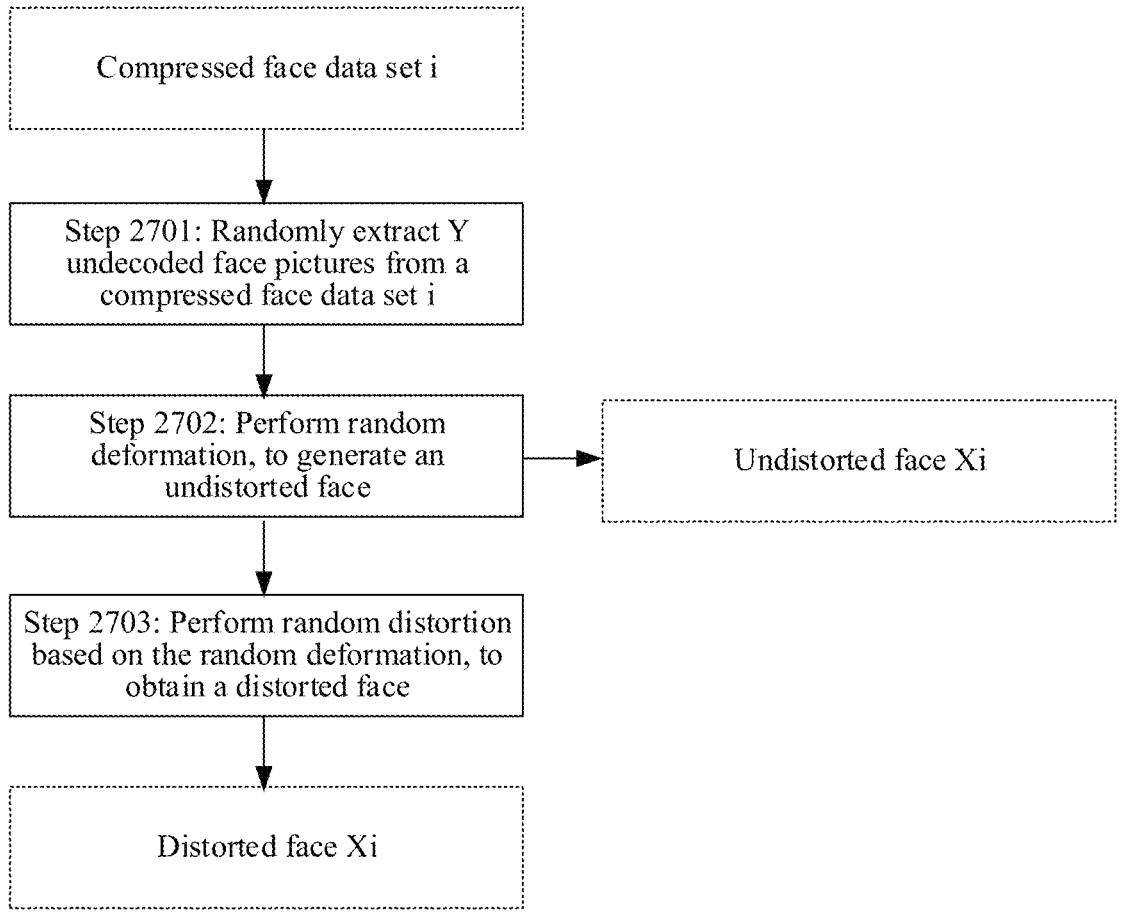
FIG. 27 is a schematic diagram of image augmentation according to an embodiment of this disclosure.

The following describes a data augmentation algorithm with decompression shown in FIG. 25. FIG. 27 is a schematic diagram of image augmentation according to an embodiment of this disclosure.

Y groups of data are augmented each time augmentation processing is performed, and Y groups of distorted faces and undistorted faces for training are recorded each time random augmentation is performed. A process of the data augmentation algorithm with decompression includes the following steps.

Step 2701. Randomly extract Y undecoded face pictures from a compressed face data set i.

Step 2702. Perform random deformation to generate an undistorted face.

Step 2703. Perform random distortion based on the random deformation, to obtain a distorted face.

Steps of the random deformation in some embodiments of this disclosure are as the followings.

(1) Perform random rotation on an input detected face by centering on an image center, a rotation angle range being α, and a preferred value of a being 30 degrees.

(2) Perform random stretch on a width and a height of the rotated face, a straightening multiple being between [1−β, 1+β], and a preferred value of β being 0.01.

(3) Perform random shifting on the image in a vertical direction and a horizontal direction for θ1 and θ2, preferred values of θ1 and θ2 being 0.01 of the width and 0.01 of the height.

(4) Perform facial image capturing to capture an image at a fixed position in a middle of the image, a percentage of a captured image being 62.5%. Then, the image is scaled to a resolution of which input is supported by the encoder.

A face image of 512*512 is used as an example, where an image of which a quantity of columns of a width and a quantity of columns of a height are within (48, 208) is captured, and then an obtained image of 161*161 is scaled to an image of 128*128.

Figure 28:
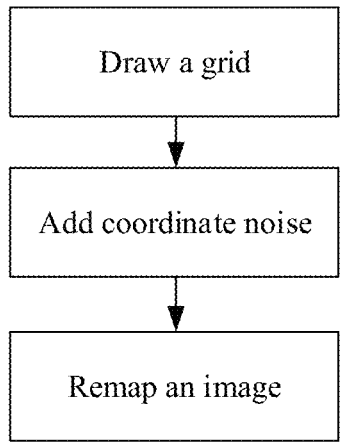
FIG. 28 is a schematic diagram of a processing process of a random distortion method according to an embodiment of this disclosure.

For a processing process of a random distortion method, reference is made to FIG. 28. FIG. 28 is a schematic diagram of a processing process of a random distortion method according to an embodiment of this disclosure, and includes:

Drawing a grid: a captured face image is recorded as a square image, which is recorded as I, and a width and a height are W. A uniform grid of N*N is drawn in an input picture shown in the following figure. A preferred density of the grid is 5*5 (meaning that, there are five nodes in a width and there are five nodes in a height).

Adding coordinate noise: coordinates (x, y) are allocated to each node. Coordinates of an $i^{th}$ row and a $j^{th}$ column are $(x_{ij}, y_{ij})$, $x_{ij}=i/N$, and $y_{ij}=j/N$. Therefore, all $x_{ij}$ (i=0, ..., and 4, j=0, ..., and 4) and $y_{ij}$ (i=0, ..., and 4, j=0, ..., and 4) form a matrix (X, Y).

Independently distributed Gaussian noise is separately added to each element in (X, Y), an expectation of the Gaussian noise is 0, a variance is σ2, and a preferred value of the variance is 0.02.

The matrix (X, Y) is considered as an image, and a width and a height of the matrix (X, Y) are enlarged to W by using an image interpolation method (where linear interpolation is preferably used) to obtain a new image (that is, a matrix) (X', Y').

A matrix (X2, Y2) with a width of W and a height of W is constructed, an element $x2_{ij}$ of the matrix X2 is equal to i/W, and an element $y2_{ij}=j/W$ in the matrix Y2 is equal to j/W. i=0, ..., and W, and j=0, ..., and W.

Remapping an image: interpolation is performed by using an image remapping method to obtain a distorted face image Z.

A pixel in an $a^{th}$ row and a $b^{th}$ column of Z is recorded as zab, an element exactly less than xab is searched for from the matrix X2, which is recorded as x2c, and an element exactly less than yij is searched for from the matrix Y2, which is recorded as x2d. Therefore, the following four points may be constructed:

A $(x2_{c,\ d}, y2_{c,\ d})$, B $(x2_{c+1,\ d}, y2_{c+1,\ d})$, C $(x2_{c,\ d+1}, y2_{c,\ d+1})$, D $(x2_{c+1,\ d+1}, y2_{c+1,\ d+1})$.

Distances dA, dB, dC, and dD between a point (xab, yab) and A, B, C, and D are separately calculated, and a value of $z_{ab}$ is obtained by weighting according to the four distances:

$$z_{ab}=dA/(dA+dB+dC+dD)*I_{c,d}+dB/(dA+dB+dC+dD)*I_{c+1,d}+dC/(dA+dB+dC+dD)*I_{c,d+1}+dD/(dA+dB+dC+dD)*I_{c+1,d+1}.$$

A distorted face is cropped by busing the same method as in the random deformation. Finally, the cropped distorted face and the deformed face form a <distorted face> <undistorted face> data pair, which is used for training a single face changing model.

The following describes the training of the fusion face changing model with a low memory occupation according to this application. Data for training the fusion face changing model is generated by using the single face changing model, and a process policy includes the following items:

(1) Not all face data sets are loaded, and only some face data sets and front face data sets are used to reduce memory occupation. The selected face data set is randomly extracted from all the face data sets, and an extracted proportion is 20%. The front face data set is manually obtained by performing screening from the randomly extracted face data set. This method of not using all the data also greatly reduces the amount of manual annotation, and the entire process of constructing the fusion face changing model is improved.

(2) At the same time, only a fixed quantity of temporary face changing models is processed to construct data for training the fusion face changing model. M is recorded as a quantity of single face changing models that can be simultaneously processed by a machine, and N is a quantity of all single face changing models. M temporary single face changing models and the face and the front face in the step 1 are constructed, and real-time decompression and augmentation are performed to obtain training data.

Figure 29A:
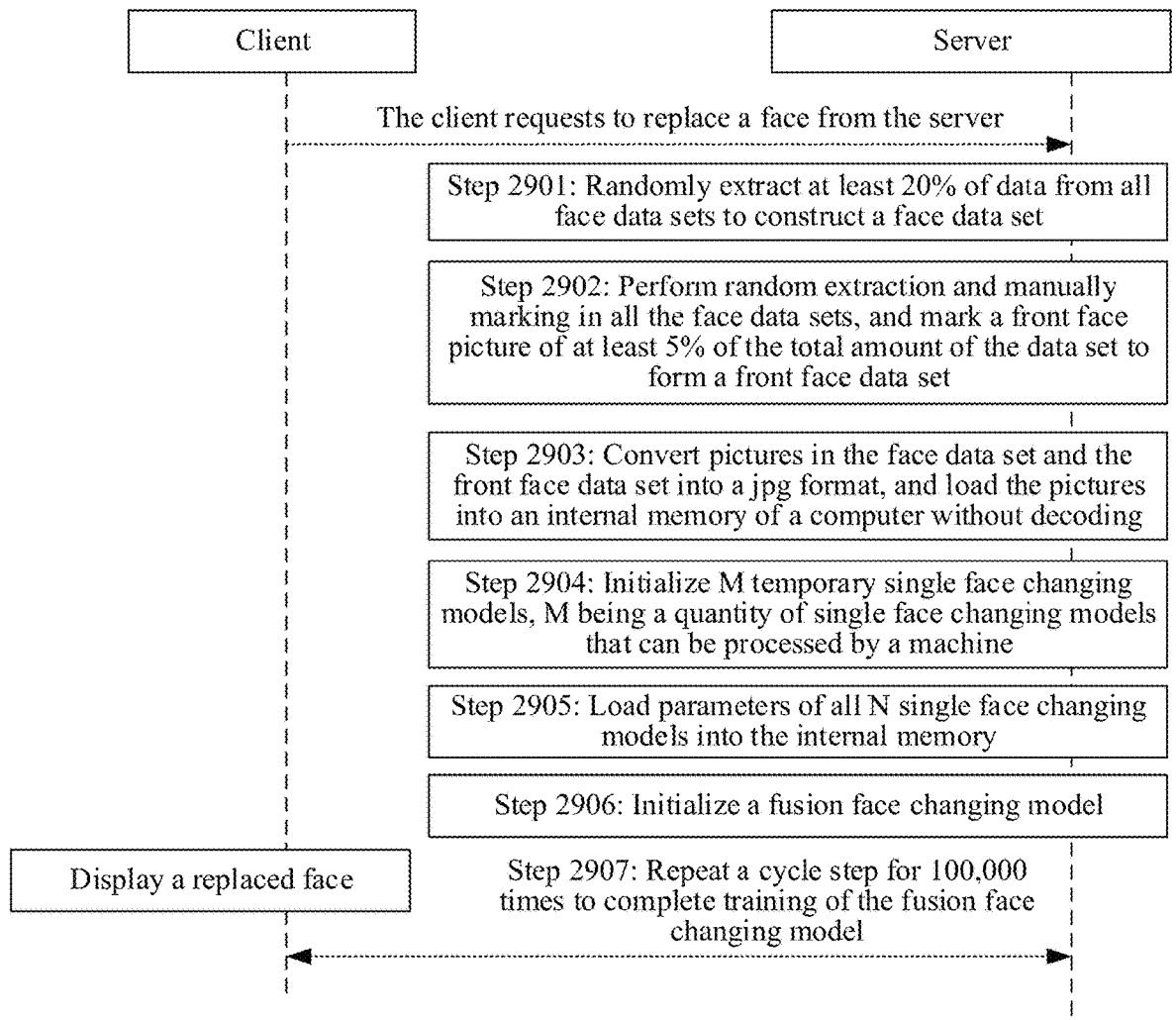
FIG. 29A is an optional schematic training flowchart of an image fusion processing method according to an embodiment of this disclosure.
Figure 29B:
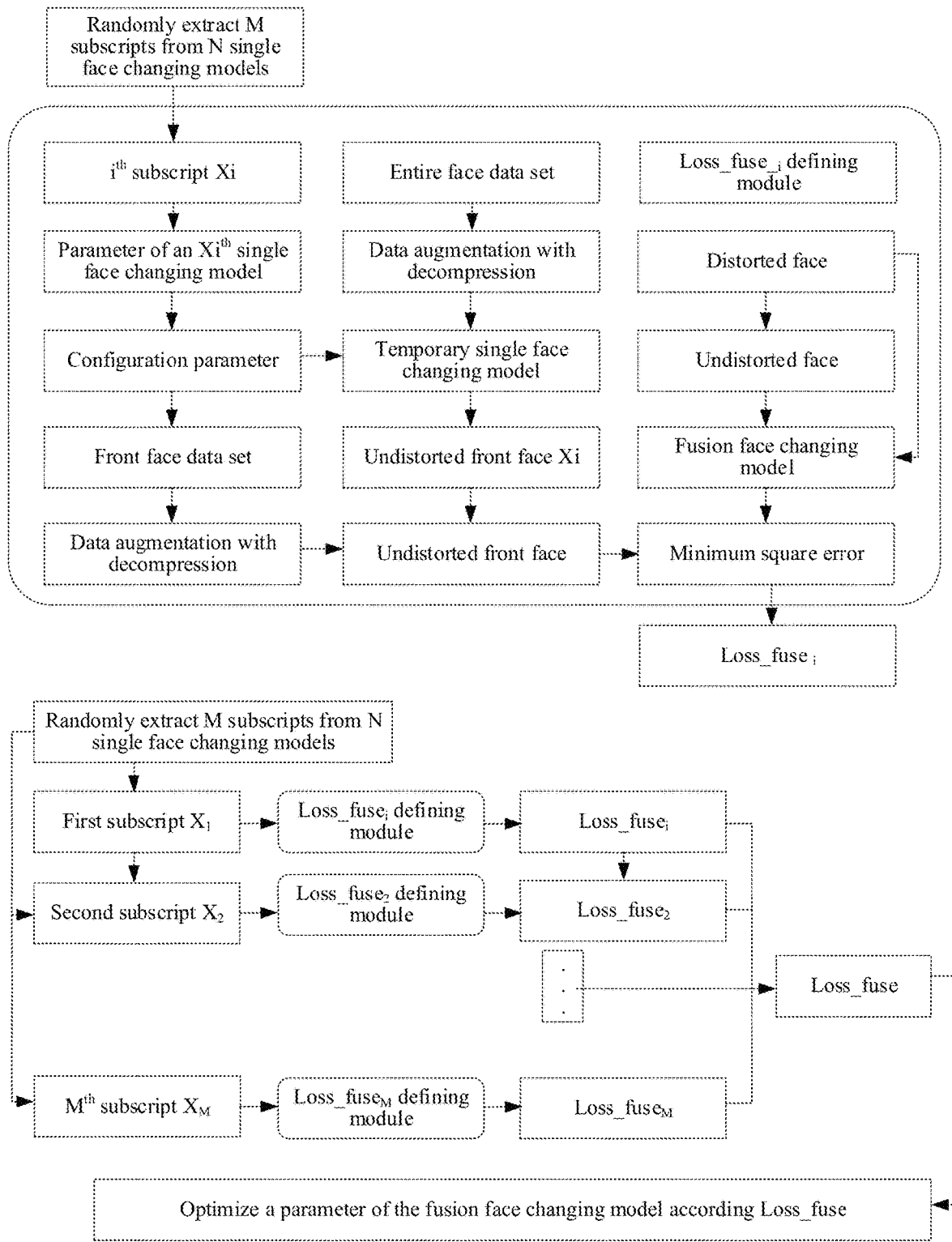
FIG. 29B is a schematic structural diagram of data of an image fusion processing method according to an embodiment of this disclosure.

For a processing process, reference is made to FIG. 29A and FIG. 29B. FIG. 29A is an optional schematic training flowchart of an image fusion processing method according to an embodiment of this disclosure. FIG. 29B is a schematic structural diagram of data of an image fusion processing method according to an embodiment of this disclosure. It may be understood that steps shown in FIG. 29A may be performed by electronic devices running the image processing apparatus for an image fusion processing model, for example, a terminal, a server, or a server cluster having an image processing function of an image fusion processing model. The following describes steps shown in FIG. 29A, and includes the following steps.

Step 2901. Randomly extract at least 20% of data from all face data sets to construct a face data set.

Step 2902. Perform random extraction and manually marking in all the face data set, and mark a front face picture of at least 5% of the total amount of the data set to form a front face data set.

Step 2903. Convert pictures in the face data set and the front face data set into a jpg format, and load the pictures into an internal memory of a computer without decoding.

Step 2904. Initialize M temporary single face changing models, M being a quantity of single face changing models that can be processed by a machine.

M is a positive integer greater than or equal to 1, and a value of M may be adjusted according to different requirements to adapt to the electronic devices running the image processing method for an image fusion processing model.

Step 2905. Load parameters of all N single face changing models into the internal memory.

N is a positive integer greater than or equal to 1, and a value of N may be adjusted according to different requirements to adapt to the electronic devices running the image processing method for an image fusion processing model.

Step 2906. Initialize a fusion face changing model.

Step 2907. Repeat a cycle step for 100,000 times to complete training of the fusion face changing model.

The cycle step includes:

(a) Randomly extract M subscripts from the N single face changing models and perform the following operations on each subscript:

(i) For an $i^{th}$ subscript Xi, input a parameter of an $Xi^{th}$ single face changing model into a temporary single face changing model i.

(ii) Randomly extract Y pieces of data from the face data set and perform the same data augmentation as described above to obtain a distorted face image.

(iii) Randomly extract Y pieces of data from the front face data set and perform the same data augmentation as described above to obtain an undistorted front face image;

and input distorted face image into the temporary face changing model i, to obtain a temporary undistorted face i.

(iv) Input the undistorted front face image into the temporary face changing model i, to obtain a temporary undistorted front face i.

(v) Substitute the distorted face image and the temporary undistorted front face i into the fusion face changing model to obtain face changing output.

(vi) Calculate a square error of the face changing output and the temporary undistorted face i to obtain loss_fuse_i.

(b) Sum all loss_fuse_i, i=1, . . . , and M, to obtain loss_fuse.

(c) Optimize a parameter of the fusion face changing model once according to the loss_fuse.

Figure 30A:
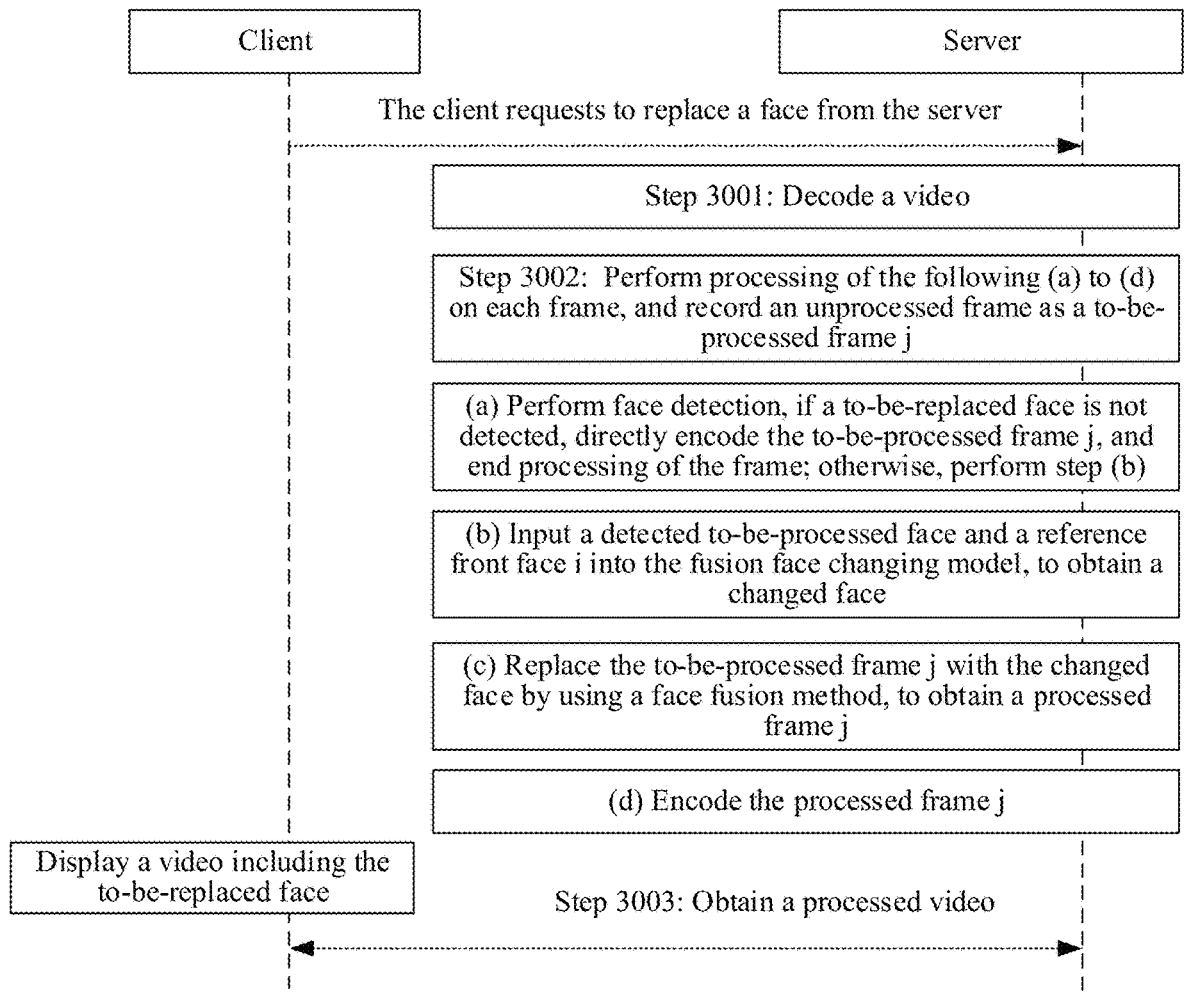
FIG. 30A is an optional schematic use flowchart of an image fusion processing method according to an embodiment of this disclosure.
Figure 30B:
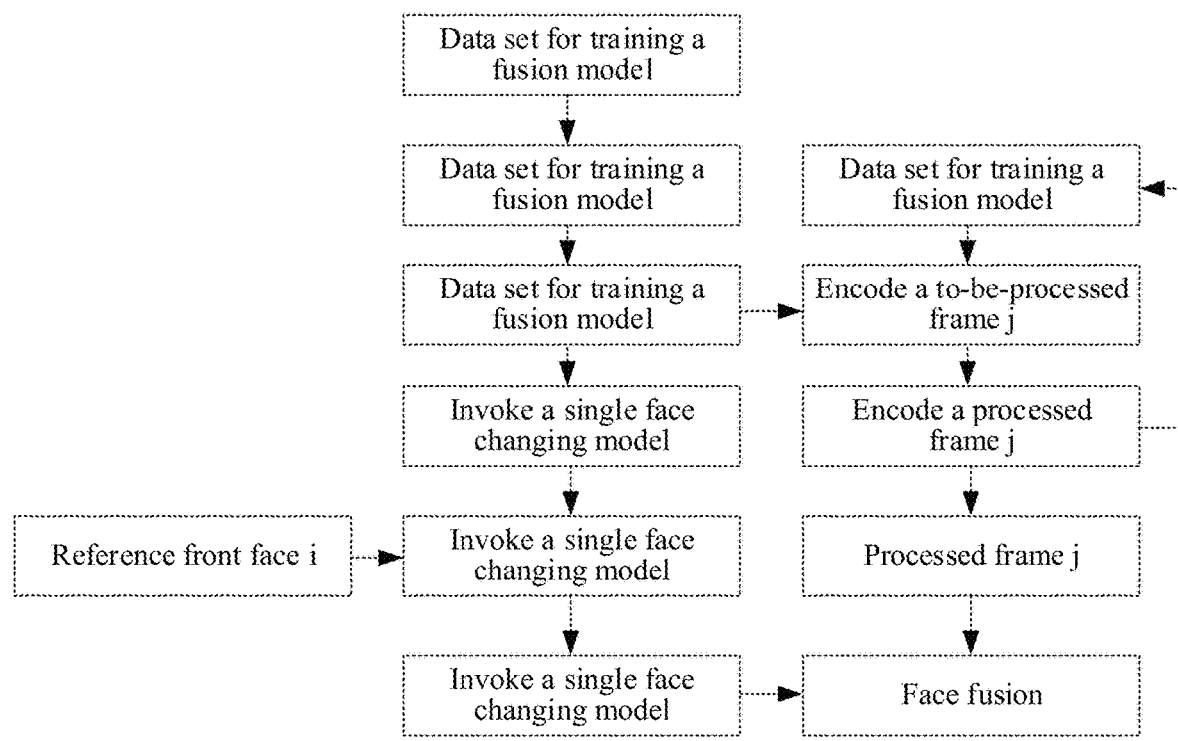
FIG. 30B is a schematic structural diagram of data of an image fusion processing method according to an embodiment of this disclosure.

For the image fusion processing method, reference may still be made to FIG. 30A and FIG. 30B. FIG. 30A is an optional schematic use flowchart of an image fusion processing method according to an embodiment of this disclosure. FIG. 30B is a schematic structural diagram of data of an image fusion processing method according to an embodiment of this disclosure. It may be understood that steps shown in FIG. 30A may be performed by electronic devices running the image processing apparatus for an image fusion processing model, for example, a terminal, a server, or a server cluster having an image processing function of an image fusion processing model. The following describes steps shown in FIG. 30A.

The following describes a use method for a fusion face changing model and includes the following steps.

Step 3001. Decode a video.

Step 3002. Perform processing of the following (a) to (d) on each frame, and record an unprocessed frame as a to-be-processed frame j.

(a) Perform face detection, if a to-be-replaced face is not detected, directly encode the to-be-processed frame j and end processing of the frame; otherwise, perform step (b).

(b) Input a detected to-be-processed face and a reference front face i into the fusion face changing model to obtain a changed face.

(c) Replace the to-be-processed frame j with the changed face by using a face fusion method, to obtain a processed frame j.

(d) Encode the processed frame j.

Step 3003. Obtain a processed video.

Figure 31:
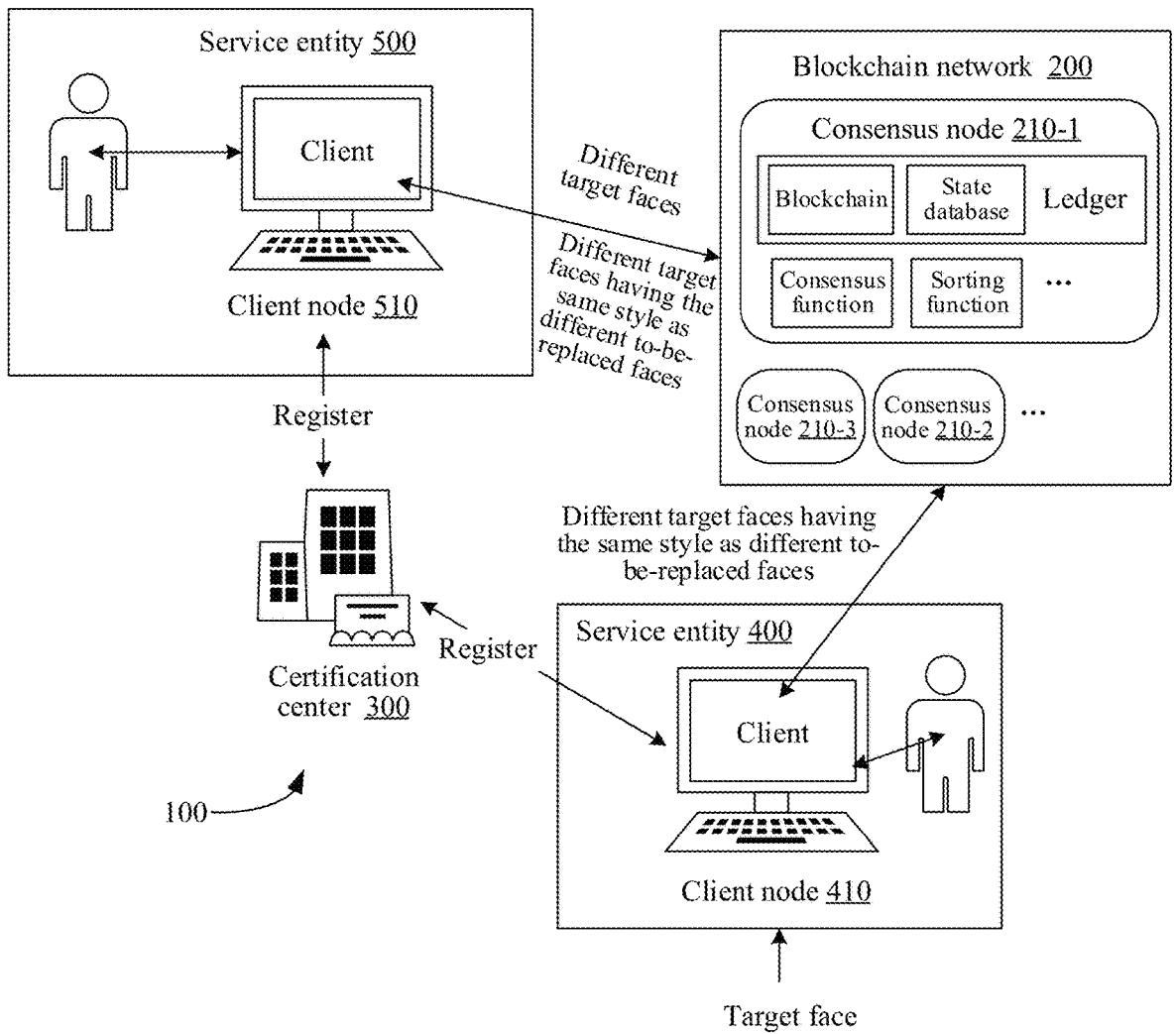
FIG. 31 is a schematic architectural diagram of image processing of an image fusion processing model according to an embodiment of this disclosure.

FIG. 31 is a schematic architectural diagram of image processing 100 of an image fusion processing model according to an embodiment of this disclosure, including a blockchain network 200 (exemplarily showing a consensus node 210-1 to a consensus node 210-3), a certification center 300, a service entity 400, and a service entity 500. Descriptions are provided separately below.

A type of the blockchain network 200 is flexible and may be, for example, any one of a public chain, a private chain, or a consortium chain. The public chain is used as an example, electronic devices such as a user terminal and a server of any service entity may access the blockchain network 200 without authorization. The consortium chain is used as an example, an electronic device (for example, a terminal/server) managed by the service entity after obtaining authorization may access the blockchain network 200, and become a client node in the blockchain network 200.

In some embodiments, the client node may serve as only an observer of the blockchain network 200, that is, provide a function of supporting the service entity to initiate transactions (for example, storing data on a chain or querying on-chain data). For functions of the consensus node 210 of the blockchain network 200, for example, a sorting function, a consensus service, and a ledger function, the client node may be implemented by default or selectively (for example, depending on the specific service requirements of the service entity). Therefore, data and service processing logic of the service entity may be migrated into the blockchain network 200 to the great extent, and credibility and traceability of the data and service processing process are implemented through the blockchain network 200.

A consensus node in the blockchain network 200 receives transactions submitted from client nodes (for example, a client node 410 belonging to the service entity 400 shown in FIG. 1 and a client node 510 belonging to a database operator system) of different service entities (for example, the service entity 400 and the service entity 500 shown in FIG. 1), executes the transaction to update a ledger or query a ledger, and returns various intermediate results or final results obtained by executing the transaction to the client node of the service entity for display.

For example, the client node 410/510 may subscribe to interested events in the blockchain network 200, for example, transactions that occur in a particular organization/channel in the blockchain network 200. A corresponding transaction notification is pushed by the consensus node 210 to the client node 410/510, thereby triggering the corresponding service logic in the client node 410/510.

The following describes exemplary application of a blockchain network by using an example in which a plurality of service entities access a blockchain network to implement management of the same target face and corresponding different to-be-replaced faces.

Referring to FIG. 31, a plurality of service entities are involved in a management step. For example, the service entity 400 may be an image processing of an image fusion processing model based on artificial intelligence, and the service entity 500 may be a display system with different to-be-replaced face processing functions. A respective digital certificate is obtained by registering with the certification center 300, and the digital certificate includes a public key of the service entity and a digital signature signed by the certification center 300 on the public key and identity information of the service entity. The digital certificate and a digital signature of the service entity for transaction are added to the transaction and sent to the blockchain network, so that the blockchain network obtains the digital certificate and the signature from the transaction and verifies reliability of a message (that is, to verify whether the message is not tempered with) and the identity information of the service entity sending the message. The blockchain network may perform verification based on an identity, for example, to verify whether it has permission to initiate a transaction. A client run by an electronic device (for example, a terminal or a server) managed by the service entity may request to access to the blockchain network 200 as a client node.

The client node 410 of the service entity 400 is configured to perform the following actions:

encode an original image set by using a state encoder of an image fusion processing model to obtain style features of different to-be-replaced faces in the original image set; encode different target faces by using a facial encoder of the image fusion processing model to obtain facial features corresponding to the different target faces; input the style features and the facial features into a fusion decoder of the image fusion processing model; perform decoding in the fusion decoder based on the style features of the different to-be-replaced faces and the facial features of the different target faces to obtain different target faces having the same style as the different to-be-replaced faces; parameters of the encoder and the decoder of the image fusion processing model being obtained by performing updating according to a single target image while parameters of an encoder and a decoder of a single image processing model maintain unchanged; and send the different target faces that have the same style as the different to-be-replaced faces and that correspond to the image fusion processing model and a corresponding target face to the blockchain network 200.

The different target faces that have the same style as the different to-be-replaced faces and that correspond to the image fusion processing model and a corresponding target face are sent to the blockchain network 200, and a service logic may be preset in the client node 410. When different target faces having the same style as the different to-be-replaced faces are formed, the client node 410 sends the different target faces matching the style as the different to-be-replaced faces and that correspond to the image fusion processing model and a corresponding target face to the blockchain network 200. Alternatively, service personnel of the service entity 400 logs in to the client node 410, manually packs the different target faces that have the same style as the different to-be-replaced faces and that correspond to the image fusion processing model and a corresponding target face, and sends to the blockchain network 200. Before sending, the client node 410 generates, according to a target text to be processed and service process information matching a type of the triggered target text, a transaction corresponding to an update operation and specifies a smart contract that needs to be invoked to implement the update operation and a parameter that needs to be transmitted to the smart contract in the transaction. The transaction further carries a digital certificate and a signed digital signature of the client node 410 and the client node 410 broadcasts the transaction to the consensus node 210 in the blockchain network 200. The digital signature is, for example, obtained by encrypting an abstract of the transaction by using a private key in the digital certificate of the client node 410.

When receiving the transaction, the consensus node 210 in the blockchain network 200 performs verification on the digital certificate and the digital signature carried in the transaction. After the verification succeeds, whether the service entity 400 has transaction permission is determined according to an identity of the service entity 400 carried in the transaction. Either of the digital signature and permission verification causes the transaction to fail. After the verification succeeds, a digital signature of the node 210 is signed, and broadcast is performed continuously in the blockchain network 200. The digital signature is obtained, for example, by encrypting an abstract of the transaction by using a private key of the node 210-1.

After the consensus node 210 in the blockchain network 200 receives the transaction of which the verification succeeds, the transaction is filled into a new block and broadcast is performed. When a new block is broadcasted by the consensus node 210 in the blockchain network 200, a consensus process is performed on the new block. If the consensus-reaching succeeds, the new block is appended to a tail of a blockchain in which the new block is stored. Further, a state database is updated according to a transaction result, and the transaction in the new block is performed. For a submitted transaction for updating a target text to be processed and corresponding service process information matching a type of the triggered target text, a key-value pair including the target text to be processed and the corresponding service process information matching the type of the triggered target text is added to the state database.

Service personnel of the service entity 500 logs in to a client node 510 and inputs a query request for the same target face or different to-be-replaced faces. The client node 510 generates, according to the query request for the same target face or the different to-be-replaced faces, a transaction corresponding to an update operation/query operation. The client node 510 further specifies a smart contract that needs to be invoked to implement the update operation/query operation and a parameter that needs to be transmitted to the smart contract in the transaction. The transaction further carries a digital certificate and a signed digital signature of the client node 510, and the client node 510 broadcasts the transaction to the consensus node 210 in the blockchain network 200. The digital signature is obtained, for example, by encrypting an abstract of the transaction by using a private key in the digital certificate of the client node 510.

After receiving the transaction, performing verification on the transaction, filling a block, and achieving a consistent consensus, the consensus node 210 in the blockchain network 200 appends the filled new block to a tail of a blockchain in which the new block is stored, updates a state database according to a transaction result, and performs transaction in the network node. For a submitted transaction for updating a manual recognition result corresponding to a same target face, a key-value pair corresponding to the same target face in the state database is updated according to the manual recognition result. For a submitted transaction for querying different target faces having the same style as different to-be-replaced faces and a corresponding target face, a key-value pair corresponding to the same target face is queried from the state database, and a transaction result is returned.

The process of directly chaining the different target faces that have the same style as the different to-be-replaced faces and that correspond to the image fusion processing model and the corresponding target face is exemplarily shown in FIG. 31. However, in some other embodiments, for a case in which the amount of data of the different target faces is relatively large, the client node 410 may chain a hash of the target face and a corresponding hash of different to-be-replaced faces in pair and store the same original target face and the corresponding different to-be-replaced face in a distributed file system or a database. After obtaining the same target face and the corresponding different to-be-replaced faces from the distributed file system or the database, the client node 510 may perform checking by combining corresponding hashes in the blockchain network 200, thereby reducing the workload of a chaining operation.

Figure 32:
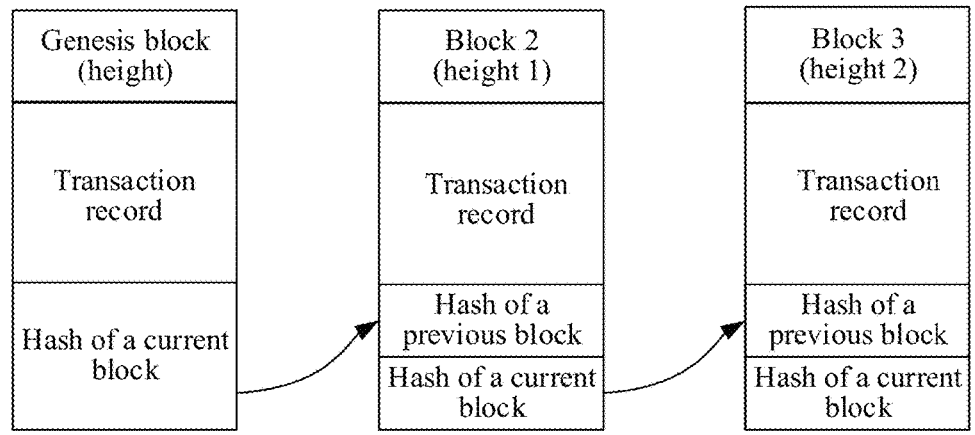
FIG. 32 is a schematic structural diagram of a blockchain in a blockchain network according to an embodiment of this disclosure.

As an example of a blockchain, FIG. 32 is a schematic structural diagram of a blockchain in a blockchain network 200 according to an embodiment of this disclosure. A header of each block may include both hash values of all transactions in the block and hash values of all transactions in a previous block. Newly generated transaction records are filled into blocks and subject to the consensus of nodes in the blockchain network, and the newly generated transaction records are appended to a tail of a blockchain to form a chain growth. The chain structure based on the hash value between the blocks ensures the anti-tampering and anti-counterfeiting of transactions in the blocks.

Figure 33:
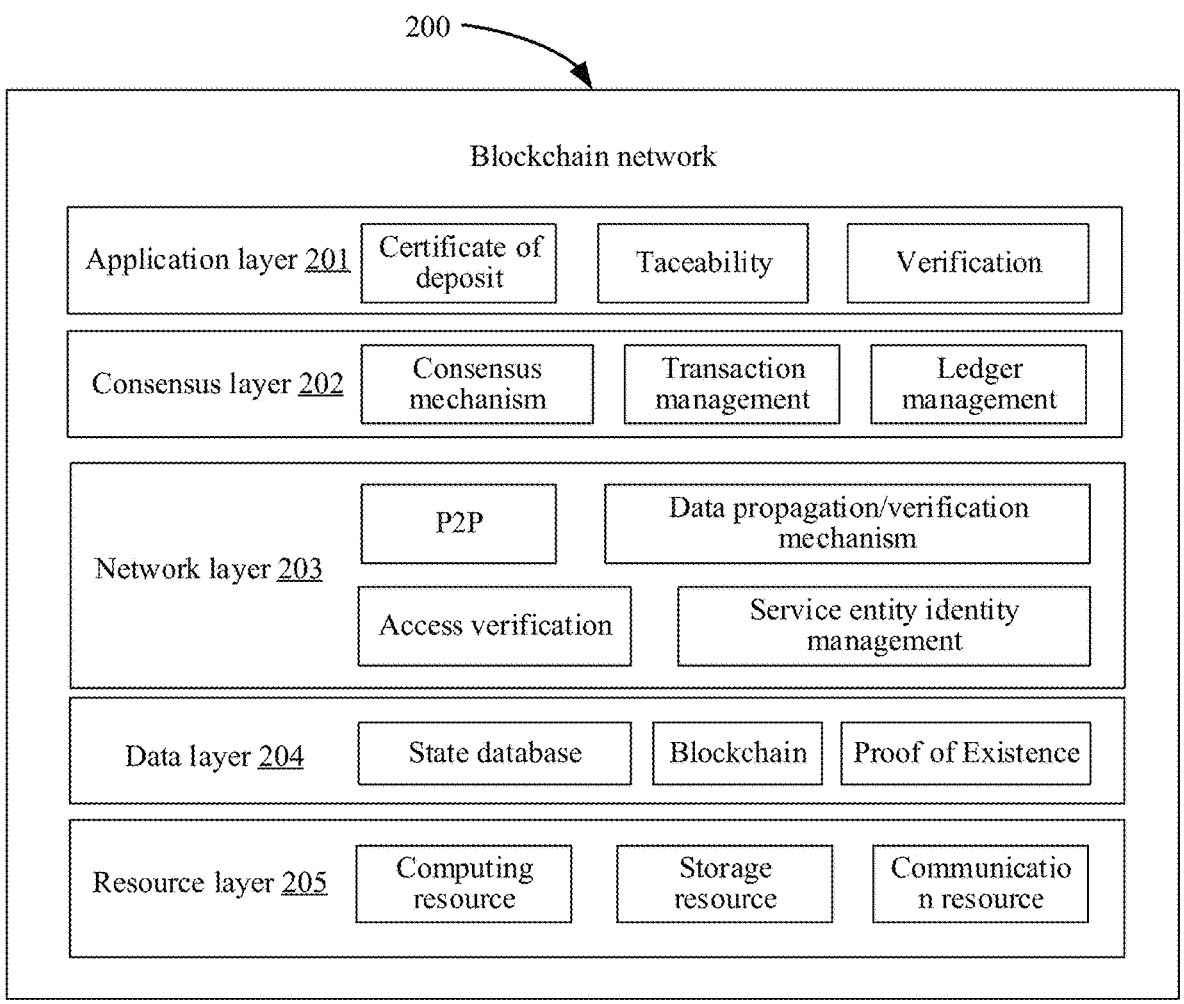
FIG. 33 is a schematic architectural diagram of a function of a blockchain network according to an embodiment of this disclosure.

The following describes an exemplary functional architecture of a blockchain network provided in the embodiment of this disclosure. FIG. 33 is a schematic architectural diagram of a function of a blockchain network 200 according to an embodiment of this disclosure, including an application layer 201, a consensus layer 202, a network layer 203, a data layer 204, and a resource layer 205. Descriptions are provided separately below.

The resource layer 205 encapsulates a compute resource, a storage resource, and a communication resource for implementing nodes 210 in the blockchain network 200.

The data layer 204 encapsulates data structures for implementing a ledger, which include a blockchain implemented by a file in a file system, a state database in a key value form, and a proof of existence (for example, a hash tree of a transaction in a block).

The network layer 203 encapsulates functions of a point to point (P2P) network protocol, a data propagation mechanism and a data verification mechanism, an access verification mechanism, and a service entity identity management.

The P2P network protocol implements communication between the nodes 210 in the blockchain network 200, and the data propagation mechanism ensures the propagation of a transaction in the blockchain network 200. The data verification mechanism is used for implementing reliability of data transmission between the nodes 210 based on a cryptography method (for example, a digital certificate, a digital signature, and a public/private key pair), and the access verification mechanism is used for performing verification on an identity of a service entity joining the blockchain network 200 according to an actual service scenario and assigning permission to the service entity to access the blockchain network 200 when the verification succeeds. The service entity identity management is used for storing an identity of a service entity that is allowed to access to the blockchain network 200, as well as permission (that is, for example, a type of a transaction that can be initiated).

The consensus layer 202 encapsulates functions of a mechanism by which the nodes 210 in the blockchain network 200 achieve consistency with blocks (that is, a consensus mechanism), transaction management, and ledger management. The consensus mechanism includes consensus algorithms such as POS, POW, and DPOS, and supports pluggable of the consensus algorithms.

The transaction management is used for verifying a digital signature carried in a transaction received by the node 210, verifying identity information of the service entity, and determining whether the service entity has permission to perform transaction according to the identity information (that is, reading related information from the service subject identity management). For the service entity that obtains authorization to access the blockchain network 200, the service entity has a digital certificate issued by a certification center, and the service entity signs a submitted transaction by using a private key in the digital certificate, so that a legal identity is declared.

The ledger management is used for maintaining a blockchain and a state database. A block of which a consensus is reached is appended to a tail of the blockchain, a transaction in the block of which the consensus is reached is performed. When the transaction includes an update operation, a key-value pair in the state database is updated. When the transaction includes a query operation, the key-value pair in the state database is queried. Then, a query result is returned to a client node of the service entity. Query operations of a plurality of types of dimensions are supported for the state database, which includes: querying a block according to a vector number of the block (for example, a hash value of a transaction); querying the block according to a hash value of the block; querying the block according to a transaction vector number; querying a transaction according to the transaction vector number; querying account data of a service entity according to an account (a vector number) of the service entity; and querying a blockchain in a channel according to a name of the channel.

The application layer 201 encapsulates various services that can be implemented by the blockchain network, including traceability, certificate of deposit, and verification of transactions.

It is promising to observe the following result after the implementation of some embodiments in this disclosure:

1. The image fusion processing model has an obvious compression effect. When the image fusion processing model is deployed in a corresponding server, a volume of the image fusion processing model is reduced to 37.92% of a conventional technology, thereby effectively reducing complexity in deployment and invoking of the image fusion processing model on a terminal.

2. Under a technical condition (deployed in the corresponding server), 523 single face changing models are fused and compressed. There are one encoder and 523 decoders before compressing, and the model occupies 31 GB of storage space in total. However, the fusion face changing model generated by the training method for an image fusion processing model provided in the some embodiments of this disclosure only occupies 738 MB of hardware resources. The compression rate reaches 2.32%, and a larger quantity of single image processing models may be fused as a capability of the hardware device increases.

3. The image fusion processing model trained according to the embodiment is better in universality, and the same model can exchange a plurality of target face images.

4. The model is simpler to use, and a face in a video image frame may be changed into a face of a target face only by inputting a front face picture of the target face without training in advance. In addition, the model is deployed in a user terminal (an electronic device with a weak processing capability), thereby a large range deployment of the image processing model can be implemented.

The foregoing descriptions are merely preferred embodiments of this disclosure, but are not intended to limit this application. Any modification, equivalent replacement and improvement made within the spirit and principle of this disclosure shall fall within the protection scope of this disclosure.

INDUSTRIAL APPLICABILITY

According to the exemplary embodiments of this disclosure, when a model is trained, an image set is obtained, and the image set is compressed, to form an original image set including at least one group of compressed face images; a parameter of an encoder of a single image processing model and a parameter of a decoder of the single image processing model are updated according to a single to-be-replaced face in the original image set, so that the decoder of the single image processing model is capable of performing decoding based on a style feature of the single to-be-replaced face, and obtaining, through decoding, a single target face having the same style as the single to-be-replaced face; and parameters of an encoder and a decoder that are of the fusion image processing model are updated according to different to-be-replaced faces and different target faces that are in the original image set in a case that the parameters of the encoder and the decoder that are of the single image processing model maintain unchanged, so that the decoder of the fusion image processing model is capable of performing decoding based on style features of the different to-be-replaced faces, and obtaining, through decoding, the different target faces having the same style as the corresponding to-be-replaced faces. Therefore, training of the decoder of the image fusion processing model and decoupling of the original image set are implemented. The complexity of the image fusion processing model is lower, and hardware storage resources are saved. Further, the trained image fusion processing model can process different original images in batches, thereby enhancing universality of the image fusion processing model. Meanwhile, in a process of updating all parameters in the image processing model, occupation of hardware resources is reduced. An increase in the costs of hardware devices is reduced, and large range deployment of the image processing model is implemented, thereby facilitating deployment of the image processing model in a mobile terminal, and reducing use costs of a user.

What is claimed is:

1. A training method for an image fusion processing model, the training method an image fusion processing model comprising:

obtaining and compressing an image set to form an original image set, the original image set comprising at least one group of compressed face images;

updating a parameter of an encoder of a single image processing model and a parameter of a decoder of the single image processing model according to a single to-be-replaced face in the original image set, so that the decoder of the single image processing model is capable of performing decoding based on a style feature of the single to-be-replaced face and obtaining, through decoding, a single target face having same style as the single to-be-replaced face; and updating parameters of an encoder and a decoder of the image fusion processing model according to different to-be-replaced faces and different target faces that are in the original image set while the parameters of the encoder and the decoder of the single image processing model remain unchanged, so that the decoder of the image fusion processing model is capable of performing decoding based on style features of the different to-be-replaced faces and obtaining, through decoding, the different target faces having same style as the corresponding different to-be-replaced faces.

2. The method according to claim 1, wherein updating the parameter of the encoder of the single image processing model and the parameter of the decoder of the single image processing model according to the single to-be-replaced face in the original image set comprises:

updating the parameter of the encoder in the single image processing model according to the single to-be-replaced face in the original image set, so that the encoder of the single image processing model is capable of performing encoding on the single to-be-replaced face and obtaining, through encoding, the style feature of the single to-be-replaced face;

updating the parameter of the decoder in the single image processing model according to the single to-be-replaced face in the original image set, so that the decoder is capable of performing decoding based on the style feature of the single to-be-replaced face; and updating the parameter of the decoder in the single image processing model according to the single target face in a single target image while the parameter of the encoder of the single image processing model remains unchanged.

3. The method according to claim 2, wherein updating the parameter of the encoder in the single image processing model according to the single to-be-replaced face in the original image set comprises:

substituting a facial image of the single to-be-replaced face in a distorted original image set into a loss function corresponding to a self-encoding network formed by the encoder and the decoder of the single image processing model and determining, while the loss function satisfies a convergence condition, the parameter corresponding to the encoder of the single image processing model, the distorted original image set being obtained by performing distortion on the original image set.

4. The method according to claim 2, wherein updating the parameter of the decoder in the single image processing model according to the single to-be-replaced face in the original image set comprises:

substituting a facial image of a single to-be-replaced face in a distorted original image set into a loss function corresponding to a self-encoding network formed by the encoder and the decoder of the single image processing model, and determining, while the loss function satisfies a convergence condition, the parameter corresponding to the decoder, the distorted original image set being obtained by performing distortion on the original image set.

5. The method according to claim 2, wherein updating the parameter of the decoder in the single image processing model according to the single target face in the single target image while the parameter of the encoder of the single image processing model remains unchanged comprises:

substituting a facial image of a single target face in a distorted single target image into a loss function corresponding to a self-encoding network formed by the encoder and the decoder of the single image processing model; and determining, while the loss function satisfies a convergence condition and the parameter corresponding to the encoder of the single image processing model in the loss function remains unchanged, the parameter corresponding to the decoder, the distorted single target image being obtained by performing distortion on the single target image.

6. The method according to claim 2, further comprising:

iteratively updating, according to the parameter of the encoder of the single image processing model and the parameter of the decoder of the single image processing model, the parameters of the encoders and the parameters of the decoders of all the single image processing models in a single image processing model set corresponding to the single image processing model, until loss functions of the parameters of the encoders and the parameters of the decoders of all the single image processing models in the single image processing model set meet respective corresponding convergence conditions, a quantity of the single image processing models in the single image processing model set being adapted to a use environment of the single image processing model.

7. The method according to claim 1, wherein before the updating the parameter of the encoder in the single image processing model according to the single to-be-replaced face in the original image set, the method further comprises:

capturing, from sample images of a sample image set, a plurality of original image sets comprising the single to-be-replaced face; and aligning the captured original image sets based on feature points of the single to-be-replaced face.

8. The method according to claim 7, wherein obtaining and compressing the image set to form the original image set comprises:

crawling an image resource in a network and performing face feature localization and data cleaning on an original image in the crawled image resource;

performing random augmentation on the original image set;

performing random distortion on the original image set, on which the random augmentation is performed, to obtain a distorted original image set;

capturing a facial image of a single to-be-replaced face in the distorted original image set, and performing scaling on the captured facial image, the captured facial image being thereby adapted to a resolution of which input is supported by the encoder of the single image processing model; and compressing the facial image on which the scaling is performed, and triggering to form binary data of a face image to use the binary data as the original image set comprising the at least one group of compressed face images, the binary data being in a undecompressed state and corresponding to a format of the facial image.

9. The method according to claim 8, wherein performing random augmentation on the original image set comprises:

performing random rotation based on a center of the original image set;

performing random scaling on the original image set after the random rotation is performed; and performing random shifting on the original image set after the random scaling is performed.

10. The method according to claim 8, wherein performing random distortion on the original image set on which the random augmentation is performed comprises:

inserting noise into the original image set on which the random augmentation is performed, the noise comprising at least one of fixed noise and dynamic noise, wherein inserting the noise into the original image set comprises:

performing gridding on the original image set on which the random augmentation is performed and allocating coordinates to at least some nodes in a grid; and adding noise corresponding to the allocated coordinates to the at least some nodes.

11. The method according to claim 1, wherein updating parameters of the encoder and the decoder of the image fusion processing model according to the different to-be-replaced faces and different target faces that are in the original image set while that the parameters of the encoder and the decoder of the single image processing model remain unchanged comprises:

using a decoding result of the decoder of the single image processing model as training supervision data in the image fusion processing model;

updating a parameter of a state encoder in the image fusion processing model according to the different to-be-replaced faces in the original image set, so that the state encoder in the image fusion processing model is capable of performing encoding on the different to-be-replaced faces separately and obtaining, through encoding, state features corresponding to the different to-be-replaced faces respectively;

updating a parameter of a facial encoder in the image fusion processing model according to the different target faces, so that the facial encoder in the image fusion processing model is capable of performing encoding on the different target faces separately and obtaining, through encoding, facial features corresponding to the different target faces respectively; and updating a parameter of a fusion decoder in the image fusion processing model according to an encoding result of the state encoder and an encoding result of the facial encoder that are in the image fusion processing model.

12. The method according to claim 11, wherein updating the parameter of the facial encoder in the image fusion processing model according to the different target faces comprises:

substituting the facial features of the different target faces into a loss function corresponding to a self-encoding network formed by the encoder and the decoder of the image fusion processing model, and determining, while the loss function satisfies a convergence condition, the parameter corresponding to the facial encoder in the image fusion processing model.

13. The method according to claim 11, further comprising:

extracting a first quantity of face images from the original image set as a first training set according to a use environment of the image fusion processing model;

extracting a second quantity of face images from the original image set as a second training set, a face image in the second training set being a front face image of a to-be-replaced face; and loading binary data of the face images and a corresponding quantity of single face changing models, in response to the first training set and the second training set, to complete training initialization of a fusion face changing model, the face images being in an undecompressed state and respectively corresponding to the first training set and the second training set.

14. An image processing method for an image fusion processing model, the method comprising:

encoding an original image set by using a state encoder of the image fusion processing model to obtain style features of different to-be-replaced faces in the original image set;

encoding different target faces by using a facial encoder of the image fusion processing model to obtain facial features corresponding to the different target faces;

inputting the style features and the facial features into a fusion decoder of the image fusion processing model; and performing decoding in the fusion decoder based on the style features of the different to-be-replaced faces and the facial features of the different target faces to obtain different target faces having same style as the different to-be-replaced faces, wherein parameters of the state encoder, facial encoder, and the fusion decoder of the image fusion processing model are obtained by performing update according to a single target image while parameters of an encoder and a decoder of a single image processing model remain unchanged.

15. A training apparatus for an image fusion processing model, comprising:

a memory configured to stored executable instructions; and a processor, when executing the instructions stored in the memory, configured to:

obtain an image set and compress the image set to form an original image set comprising at least one group of compressed face images;

update a parameter of an encoder of a single image processing model and a parameter of a decoder of the single image processing model according to a single to-be-replaced face in the original image set, so that the decoder of the single image processing model is capable of performing decoding based on a style feature of the single to-be-replaced face and obtaining, through decoding, a single target face having same style as the single to-be-replaced face; and update parameters of an encoder and a decoder of the image fusion processing model according to different to-be-replaced faces and different target faces that are in the original image set while the parameters of the encoder and the decoder that are of the single image processing model remain unchanged, so that the decoder of the image fusion processing model is capable of performing decoding based on style features of the different to-be-replaced faces and obtaining, through decoding, different target faces having same styles as the corresponding to-be-replaced faces.

16. The apparatus according to claim 15, wherein, to update the parameter of the encoder of the single image processing model and the parameter of the decoder of the single image processing model according to the single to-be-replaced face in the original image set, the processor is configured to execute the instructions to:

update the parameter of the encoder in the single image processing model according to the single to-be-replaced face in the original image set, so that the encoder of the single image processing model is capable of performing encoding on the single to-be-replaced face and obtaining, through encoding, the style feature of the single to-be-replaced face;

update the parameter of the decoder in the single image processing model according to the single to-be-replaced face in the original image set, so that the decoder is capable of performing decoding based on the style feature of the single to-be-replaced face; and update the parameter of the decoder in the single image processing model according to the single target face in a single target image while the parameter of the encoder of the single image processing model remains unchanged.

17. The apparatus according to claim 16, wherein, to update the parameter of the encoder in the single image processing model according to the single to-be-replaced face in the original image set, the processor is configured to execute the instructions to:

substitute a facial image of the single to-be-replaced face in a distorted original image set into a loss function corresponding to a self-encoding network formed by the encoder and the decoder of the single image processing model; and determine, while the loss function satisfies a convergence condition, the parameter corresponding to the encoder of the single image processing model, the distorted original image set being obtained by performing distortion on the original image set.

18. The apparatus according to claim 16, wherein, to update the parameter of the decoder in the single image processing model according to the single to-be-replaced face in the original image set, the processor is configured to execute the instructions to:

substitute a facial image of a single to-be-replaced face in a distorted original image set into a loss function corresponding to a self-encoding network formed by the encoder and the decoder of the single image processing model; and determine, while the loss function satisfies a convergence condition, the parameter corresponding to the decoder, the distorted original image set being obtained by performing distortion on the original image set.

19. The apparatus according to claim 16, wherein to update the parameter of the decoder in the single image processing model according to the single target face in the single target image while the parameter of the encoder of the single image processing model remains unchanged, the processor is configured to execute the instructions to:

substitute a facial image of a single target face in a distorted single target image into a loss function corresponding to a self-encoding network formed by the encoder and the decoder of the single image processing model; and determine, while the loss function satisfies a convergence condition and the parameter corresponding to the encoder of the single image processing model in the loss function remains unchanged, the parameter corresponding to the decoder, the distorted single target image being obtained by performing distortion on the single target image.

20. The apparatus according to claim 16, wherein the processor is further configured to execute the instructions to:

iteratively update, according to the parameter of the encoder of the single image processing model and the parameter of the decoder of the single image processing model, the parameters of the encoders and the parameters of the decoders of all the single image processing models in a single image processing model set corresponding to the single image processing model, until loss functions of the parameters of the encoders and the parameters of the decoders of all the single image processing models in the single image processing model set meet respective corresponding convergence conditions, a quantity of the single image processing models in the single image processing model set being adapted to a use environment of the single image processing model.

\* \* \* \* \*